US011891842B2

(12) United States Patent
Yoda et al.

(10) Patent No.: US 11,891,842 B2
(45) Date of Patent: Feb. 6, 2024

(54) ACTUATION TRANSMISSION MECHANISM, DETECTION DEVICE EQUIPPED WITH CONCERNED MECHANISM, AND MOTOR-VEHICLE DOOR LOCKING DEVICE EQUIPPED WITH CONCERNED DETECTION DEVICE

(71) Applicant: MITSUI KINZOKU ACT CORPORATION, Yokohama (JP)

(72) Inventors: Yuji Yoda, Yokohama (JP); Ryo Miyanaga, Yokohama (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 161 days.

(21) Appl. No.: 17/500,207

(22) Filed: Oct. 13, 2021

(65) Prior Publication Data

US 2022/0112747 A1 Apr. 14, 2022

(30) Foreign Application Priority Data

Oct. 14, 2020 (JP) ................................ 2020-172969

(51) Int. Cl.
*E05B 81/30* (2014.01)
*E05B 85/06* (2014.01)
(Continued)

(52) U.S. Cl.
CPC .............. *E05B 81/30* (2013.01); *E05B 81/72* (2013.01); *E05B 83/36* (2013.01); *E05B 85/06* (2013.01)

(58) Field of Classification Search
CPC .......... E05B 81/06; E05B 81/16; E05B 81/30; E05B 81/64; E05B 81/72; E05B 81/74; E05B 81/90; E05B 85/06; E05B 83/36
See application file for complete search history.

(56) References Cited

U.S. PATENT DOCUMENTS 8,616,594 B2 12/2013 Shimura et al.
8,919,827 B2 * 12/2014 Akizuki ................. E05B 81/36 292/216

(Continued)

FOREIGN PATENT DOCUMENTS

CN 1499034 A 5/2004
CN 1673014 A 9/2005

(Continued)

OTHER PUBLICATIONS

He, "Three Major Chronograph Movements Revealed," Clocks and Watches, No. 10, Oct. 2007, pp. 88-92.

(Continued)

*Primary Examiner* — Christine M Mills
*Assistant Examiner* — Christopher F Callahan
(74) *Attorney, Agent, or Firm* — NIXON & VANDERHYE

(57) ABSTRACT

An actuation transmission mechanism comprising a transmitting member that is pivotably supported to pivot in at least one driving direction from a predetermined initial position to be capable of transmitting its pivoting motion to a transmitted member that is pivotably supported in the vicinity of the transmitting member to pivot in at least one driven direction from a predetermined driven initial position, wherein the transmitting member has a formation such that when the transmitting member pivots from the initial position in the one driving direction, the transmitting member abuts against the transmitted member to make the transmitted member pivot in the one driven direction from the driven initial position to a predetermined detection position, and thereafter, though the transmitting member subsequently pivots in the one driving direction further, the transmitting member does not make the transmitted member (Continued)

pivot overly to a large extent in the one driven direction from the detection position.

16 Claims, 14 Drawing Sheets

(51) Int. Cl.

| | |
|---|---|
| ***E05B 81/72*** | (2014.01) |
| ***E05B 83/36*** | (2014.01) |

(56) References Cited

U.S. PATENT DOCUMENTS

| | | | | |
|---|---|---|---|---|
| 2010/0026014 | A1* | 2/2010 | Machida | E05B 83/40 292/216 |
| 2010/0109352 | A1 | 5/2010 | Tien et al. | |
| 2012/0266639 | A1* | 10/2012 | Yamagata | E05B 81/42 70/372 |
| 2016/0333615 | A1* | 11/2016 | Enomoto | E05B 81/34 |
| 2017/0298661 | A1 | 10/2017 | Byun et al. | |
| 2018/0023325 | A1* | 1/2018 | Takagi | E05B 85/20 292/259 A |
| 2018/0230715 | A1 | 8/2018 | Ishiguro et al. | |

FOREIGN PATENT DOCUMENTS

| | | | |
|---|---|---|---|
| CN | 201561386 | U | 8/2010 |
| CN | 102713117 | A | 10/2012 |
| CN | 102797392 | A | 11/2012 |
| CN | 203846892 | U | 9/2014 |
| CN | 104252121 | A | 12/2014 |
| CN | 203989854 | U | 12/2014 |
| CN | 105672772 | A | 6/2016 |
| CN | 105697582 | A | 6/2016 |
| CN | 107620783 | A | 1/2018 |
| CN | 107635887 | A | 1/2018 |
| CN | 108368713 | A | 8/2018 |
| CN | 108999501 | A | 12/2018 |
| CN | 208331226 | U | 1/2019 |
| CN | 109291897 | A | 2/2019 |
| CN | 110173170 | A | 8/2019 |
| CN | 210164366 | U | 3/2020 |
| JP | H08-013878 | A | 1/1996 |
| JP | 2002-339618 | A | 11/2002 |
| JP | 2012-041764 | A | 3/2012 |
| JP | 4905716 | B2 | 3/2012 |
| JP | 5205679 | | 6/2013 |

OTHER PUBLICATIONS

Liu, "Application of New Redundant Electro-hydraulic Governor in Large bulb Tubular Water Turbine," Water Resources and Power, vol. 31, No. 10, Oct. 2013, pp. 152-155.

Office Action issued in Chinese Patent Application No. 202111186548.6 dated Aug. 18, 2022.

Office Action issued in Indian Patent Application No. 202114045948 dated May 24, 2022.

* cited by examiner

ACTUATION TRANSMISSION MECHANISM, DETECTION DEVICE EQUIPPED WITH CONCERNED MECHANISM, AND MOTOR-VEHICLE DOOR LOCKING DEVICE EQUIPPED WITH CONCERNED DETECTION DEVICE

This application claims priority to JP Patent Application No. 2020-172969 filed Oct. 14, 2020, the entire contents of each of which are hereby incorporated by reference.

FIELD OF THE INVENTION

The present invention relates to an actuation transmission mechanism, a detection device equipped with the mechanism, and a motor-vehicle door locking device equipped with the detection device.

BACKGROUND OF THE INVENTION

A certain conventional motor-vehicle door locking device comprises:

a locking lever that is movable between an unlocked position and a locked position according to an operation of a key cylinder provided in a vehicle-exterior side of a door, a key lever and a detected link which are actuated according to the unlocking/locking operation of the key cylinder, and a detection switch of which a detection lever connected with the detected link pivots according to the actuation of the detected link to detect the unlocking/locking operation of the key cylinder (for example, see JP 5,205,679 B).

Normally, from a viewpoint of security of a vehicle, it is desirable for such a motor-vehicle door locking device that before the position switch (corresponding to the detection switch 27 in JP 5,205,679 B) detects the unlocking of the locking lever, a detection switch detects the unlocking operation of the key cylinder by turning on an electric contact point in an unlocking side of the detection switch on the basis of the actuation of the detected link according to the unlocking operation of the key cylinder. The reason is that for example, in the case of taking a security measure such as activating an alarm device when a situation occurs in which the locking lever is directly operated to unlock by a dishonest act and the position switch detects the unlocking of the locking lever in a state before or without detection of the unlocking operation of the key cylinder, it is necessary that the detection switch surely detects the unlocking operation of the key cylinder earlier than the position switch detects the unlocking when the key cylinder is operated to unlock by a regular user.

SUMMARY OF THE INVENTION

However, in the case of the motor-vehicle door locking device described in JP 5,205,679 B, when the detection switch is made to be capable of detecting the unlocking operation of the key cylinder early, the detection lever of the detection switch is made to pivot in a detection direction according to the actuation of the detected link on the basis of the unlocking operation of the key cylinder and is made to pivot to a large extent in the detection direction further after detecting the unlocking operation of the key cylinder. Therefore, when the detection lever is made to pivot to a large extent in the detection direction, the detection lever is given a large load, and durability of the detection lever of the key switch may be lowered.

Moreover, also in the case of a device other than the motor-vehicle door locking device, in which the detected link is a transmitting member and the detection lever is a transmitted member, when the actuation of the transmitting member actuated by operation of an operation device such as a key cylinder, an operation handle or an actuator is transmitted to the transmitted member more than necessary in the transmission of the actuation of the transmitting member to the transmitted member, the detection lever is given a large load, and durability of the detection lever of the key switch may be lowered. Therefore, it is desired an actuation transmission mechanism in which actuation of a transmitting member is not transmitted to a transmitted member more than necessity.

In view of the above disadvantages of the conventional techniques, an object of the present invention is to provide an actuation transmission mechanism of which durability of a transmitted member can be improved, a detection device comprising such a mechanism, and a motor-vehicle door locking device comprising such a detection device.

According to the present invention, the above problems are solved as follows. Namely, an actuation transmission mechanism of the present invention comprises a transmitting member that is pivotably supported to pivot in at least one driving direction from a predetermined initial position to be capable of transmitting its pivoting motion to a transmitted member that is pivotably supported in the vicinity of the transmitting member to pivot in at least one driven direction from a predetermined driven initial position, characterized in that the transmitting member has a formation in which when the transmitting member pivots from the initial position in the one driving direction, the transmitting member abuts against the transmitted member to make the transmitted member pivot in the one driven direction from the driven initial position to a predetermined detection position, and thereafter, though the transmitting member subsequently pivots in the one driving direction further, the transmitting member does not make the transmitted member pivot overly to a large extent in the one driven direction from the detection position.

A detection device of the present invention equipped with the above-described actuation transmission mechanism, characterized in that the transmitted member is a detection lever that is supported to a casing of a detection switch having an electric contact point so as to be pivotable at a predetermined angle and pivots at least in one driven direction from the predetermined driven initial position to the detection position to turn on the detection switch, and the transmitting member is connected with an operation device provided on a predetermined position so as to pivot at least in one driving direction from the initial position on the basis of an operation of the operation device.

A motor-vehicle door locking device of the present invention comprising the above-described detection device and a locking lever movable from an unlocked position to a locked position and vice versa according to an operation of a key cylinder provided on a door, characterized in that the operation device is the key cylinder, and the transmitting member pivots in one driving direction from the initial position according to an unlocking operation of the key cylinder.

A motor-vehicle door locking device of the present invention comprises the above-described detection device, a locking lever movable from an unlocked position to a locked position and vice versa according to an operation of a key cylinder provided on a door, a position switch detecting the unlocked position of the locking lever, and a spring of which a biasing direction acting on the locking lever reverses with an intermediate position between the unlocked and locked positions of the locking lever as a boundary, characterized in that the operation device is the key cylinder, the transmitting member pivots in one driving direction from the initial position according to an unlocking operation of the key cylinder and in another driving direction from the initial position according to a locking operation of the key cylinder, the detection switch detects the unlocking operation of the key cylinder on the basis that the detection lever pivots to the detection position before the locking lever reaches the intermediate position from the locked position according to the unlocking operation of the key cylinder, and thereafter, the position switch detects unlocking of the locking lever.

According to the actuation transmission mechanism of the present invention, since the transmitted member does not overly pivot to a large extent in one driven direction from the detection position after the transmitted member is made to pivot to the detection position by pivoting of the transmitting member, it is capable of improving the durability of the transmitted member.

According to the detection device of the present invention, since the detection lever does not overly pivot to a large extent in one driven direction from the detection position after the detection lever of the detection switch is made to pivot to the detection position by pivoting of the transmitting member, it is capable of improving the durability of the detection switch.

According to the motor-vehicle door locking device of the present invention, since the detection switch detects the unlocking operation of the key cylinder before the biasing direction of the spring reverses, it is capable of surely detecting the unlocking operation of the key cylinder earlier than the position switch detects the unlocking and improving the durability of the detection switch.

EMBODIMENTS OF THE INVENTION

Figure 2:
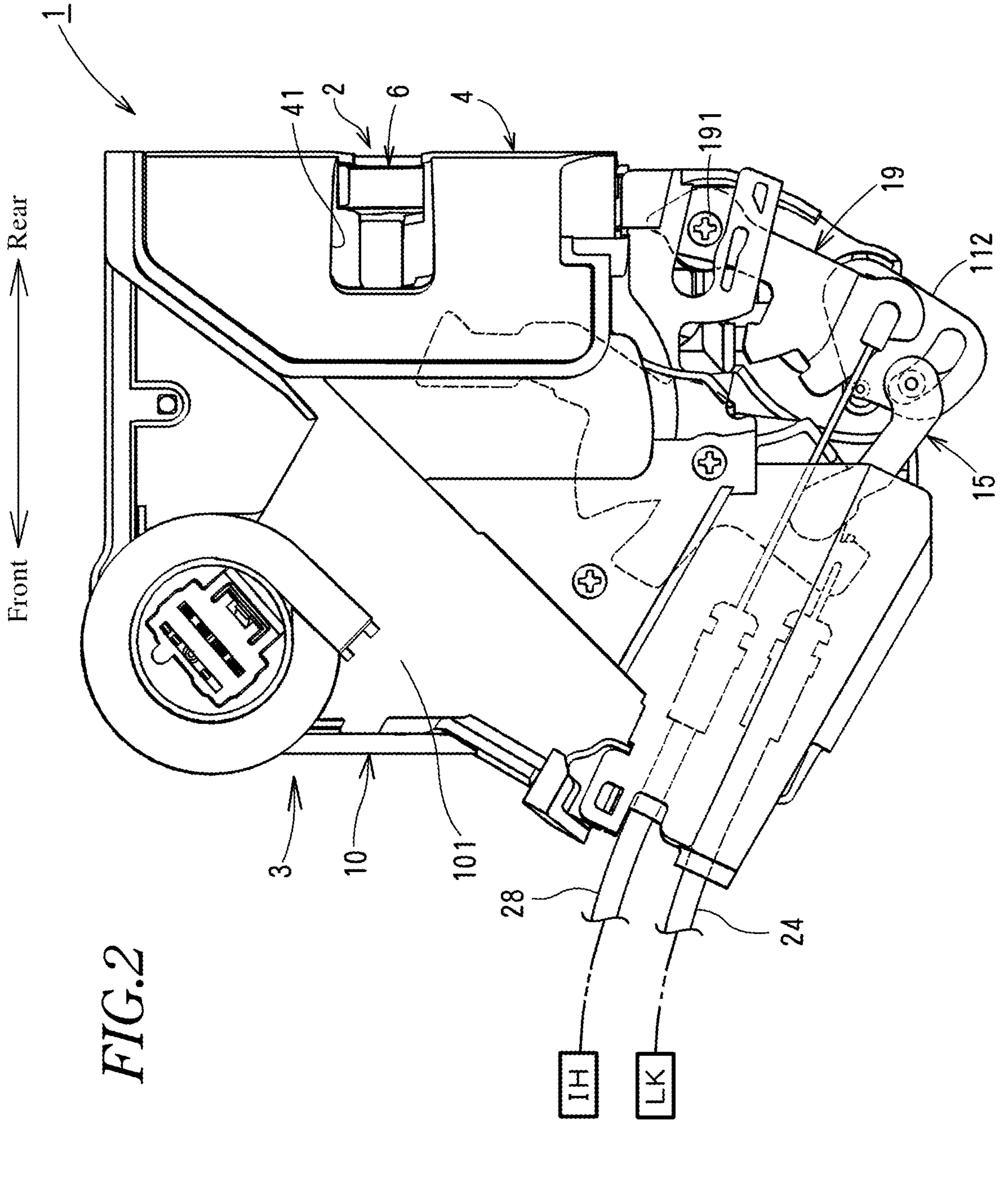
FIG. 2 is a vehicle-interior side elevational view showing the door locking device viewed from a direction of the arrow II in FIG. 1.
Figure 3:
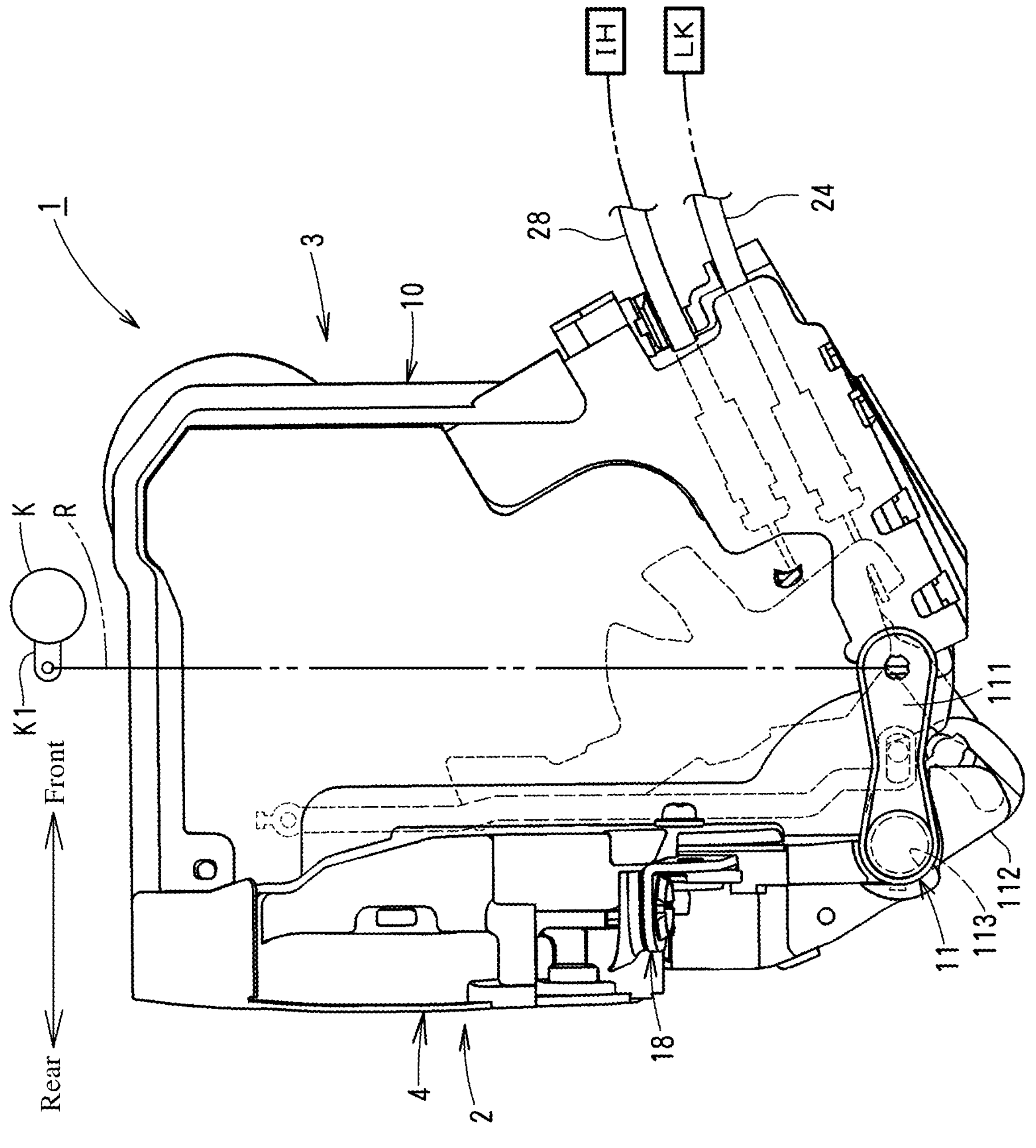
FIG. 3 is a vehicle-exterior side elevational view showing the door locking device viewed from a direction of the arrow III in FIG. 1.

An embodiment according to the present invention is described with the drawings as follows. A door locking device 1 shown in FIGS. 1 to 3 is fixed to a rear end portion of a front door (this door is not shown and referred to as "door" below) of a motor vehicle, and is comprised of an engagement unit 2 to hold the door in a closed state and an operation unit 3 assembled to the engagement unit 2.

Figure 1:
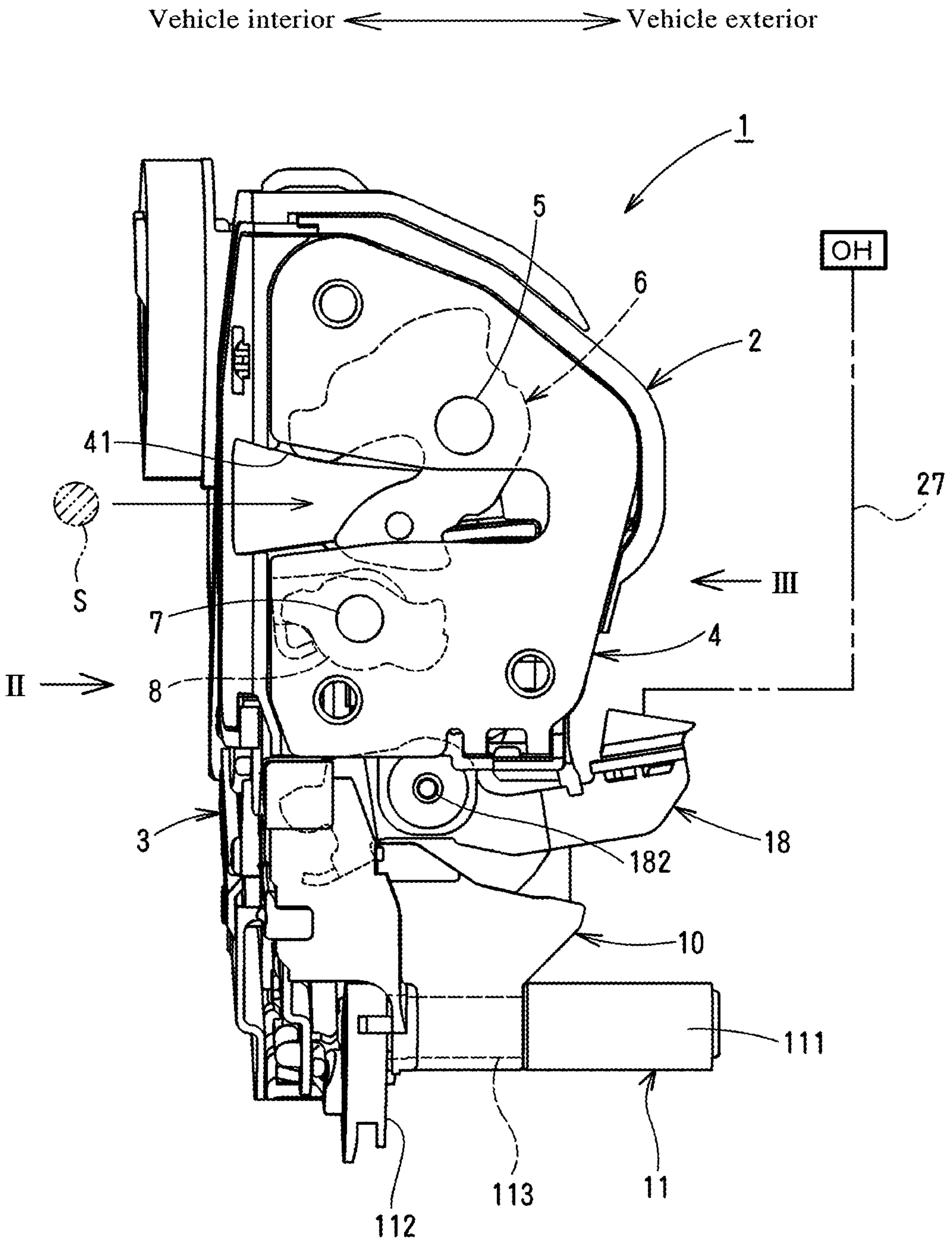
FIG. 1 is a front view showing a door locking device of the present invention viewed from a rearward direction.

Particularly as shown in FIG. 1, the engagement unit 2 comprises a body 4 fixed in the door by bolts not shown. The engagement unit 2 is formed by arranging a latch 6 and a pawl 8 in the body 4 and by arranging an opening lever 9 (see FIGS. 4, 5) on a front surface side of the body 4, wherein the latch 6 is pivotably supported by a latch shaft 5 oriented in a longitudinal direction and is capable of engaging with a striker S provided on a vehicle body side when the door is closed, wherein a pawl 8 is pivotably supported by a pawl shaft 7 oriented in the longitudinal direction and is capable of engaging with the latch 6, and wherein the opening lever 9 is capable of pivoting integrally with the pawl 8.

When the door is closed, the striker S relatively enters into a striker entrance groove 41 provided in the body 4 from a vehicle-interior side to engage with the latch 6. The latch 6 pivots at about 90 degrees around the latch shaft 5 in a counterclockwise direction from an open position shown in FIG. 1, and the pawl 8 engages with the latch 6 by a biasing force of a spring not shown to prevent the latch 6 from pivoting in an opening direction (a clockwise direction in FIG. 1), and thereby holding the door in the closed state.

When the door is in the closed state, by pivoting of the opening lever 9 on the basis of an opening operation of an outside handle OH provided on a vehicle-exterior side of the door or an inside handle IH provided on the vehicle-interior side of the door, the pawl 8 pivots in the opening direction (the clockwise direction in FIG. 1) to release from the latch 6, and thereby enabling the door to be released.

As shown in FIGS. 2, 3, the operation unit 3 has a housing 10 made of a synthetic resin fixed to the front surface of the body 4. Particularly as shown in FIGS. 3 to 5, the housing 10 is provided with a key lever 11 that is coupled with a key cylinder K (this corresponds to an operation device in the present invention) provided on the vehicle-exterior side of the door;

- a locking lever 12 capable of pivoting to an unlocked position and a locked position;
- a position switch 13 detectable the unlocked position of the locking lever 12;
- an opening link 14 movable to an unlocked position and a locked position with the locking lever 12;
- a coupling link 15 coupling the key lever 11 and the locking lever 12;
- a motor 16 rotatable normally and reversely;
- a worm wheel 17 that rotates normally and reversely by the motor 16 and is capable of transmitting its rotation to the locking lever 12;
- an outside lever 18 coupled with the outside handle OH;
- an inside lever 19 coupled with the inside handle IH; and
- a detection device 20 for detecting operation of the key cylinder K.

Figure 4:
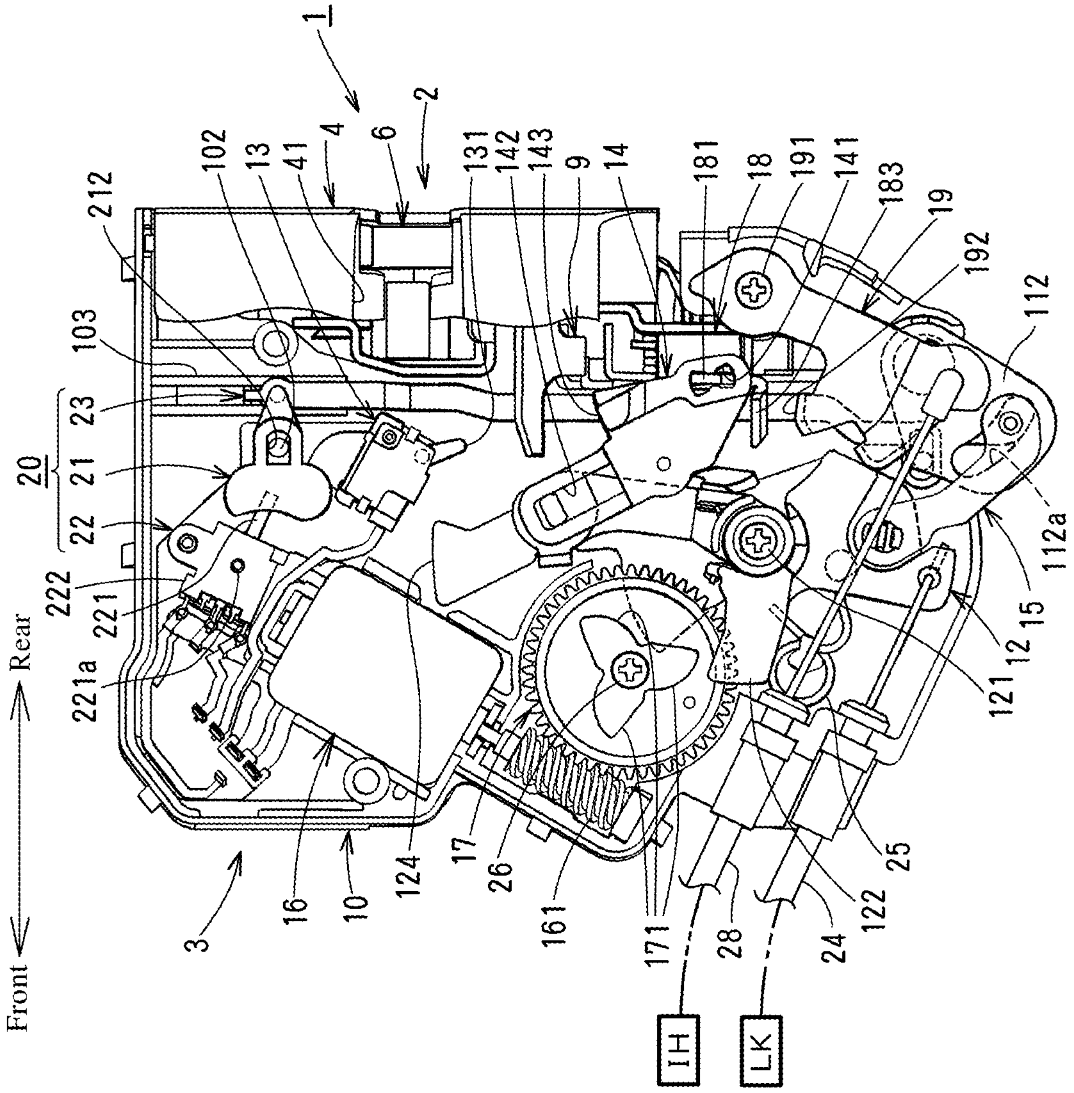
FIG. 4 is a vehicle-interior side elevational view showing an internal structure of the door locking device in a locking state.
Figure 5:
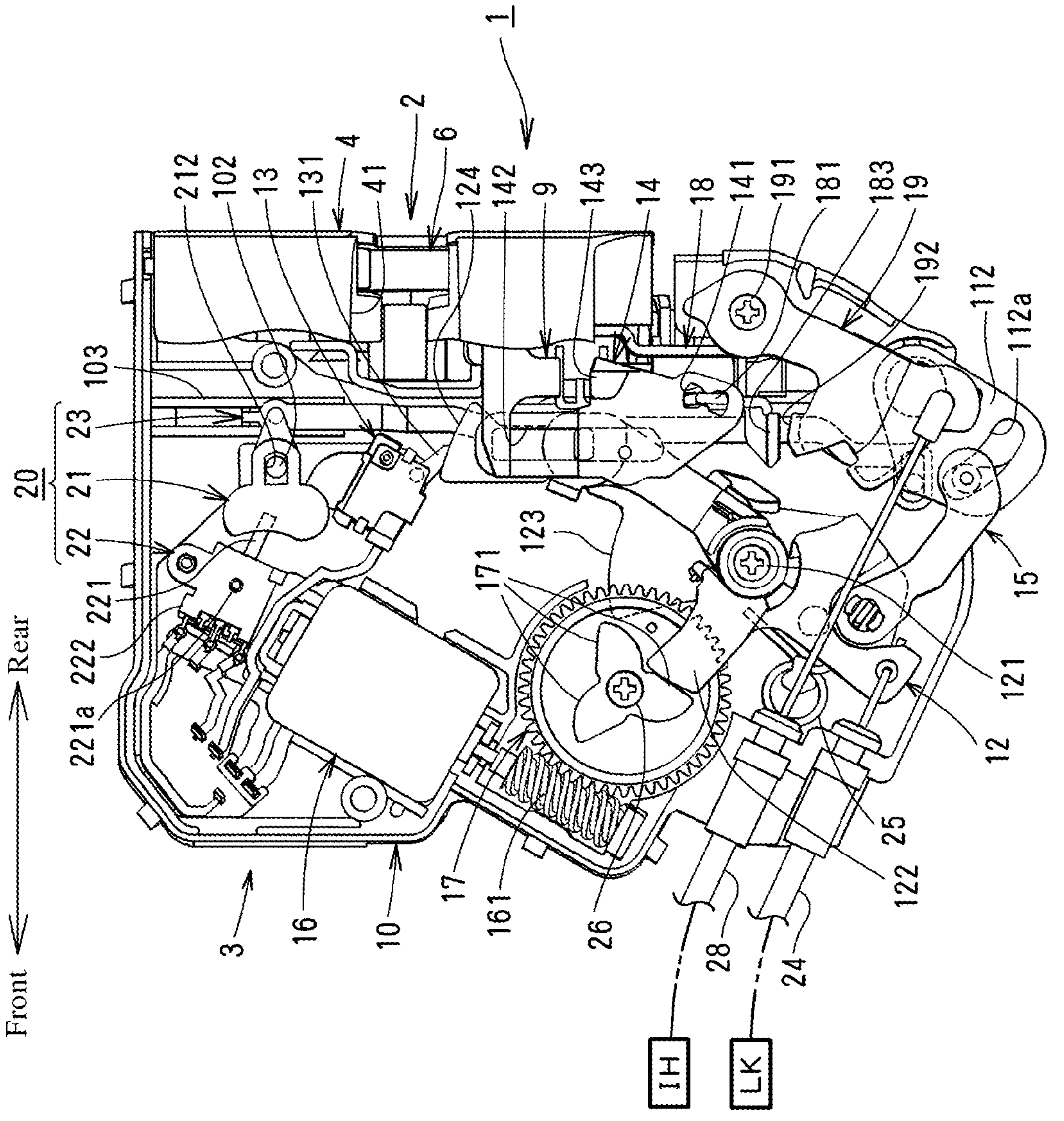
FIG. 5 is a vehicle-interior side elevational view showing an internal structure of the door locking device in an unlocking state.

Incidentally, in FIGS. 4, 5, to show an internal structure of the operation unit 3, the body 4 is shown with partially cut off and a cover 101 (see FIG. 2) closing a rear surface of the housing 10 is omitted.

The key lever 11 is pivotably supported to a lower portion of the housing 10 by a shaft 113 oriented to a lateral direction and is comprised of an external lever 111 exposed to the outside of the housing 10 and an internal lever 112 that is arranged in the inside of the housing 10 to be pivotable integrally with the external lever 111.

The external lever 111 is connected with a lever K1 of the key cylinder K via an operating-force transmitting member R (see FIG. 3) such as a rod in a vertical direction, pivots at a predetermined angle from an initial position shown in FIG. 3 in a locking direction (the clockwise direction in FIG. 3) according to pivoting of the lever K1 from a neutral position in the counterclockwise direction by a locking operation of the key cylinder K, and pivots at a predetermined angle from the initial position in an unlocking direction (the counter-clockwise direction in FIG. 3) according to pivoting of the lever K1 from the neutral position in the clockwise direction by an unlocking operation of the key cylinder K.

The internal lever 112 pivots at a predetermined angle integrally with the external lever 11 from each initial position shown in FIGS. 4, 5 in a locking direction (the counterclockwise direction in FIGS. 4, 5) and an unlocking direction (the clockwise direction in FIGS. 4, 5). A long hole **112*a* formed in an arc shape and provided in a lower portion of the internal lever 112 is coupled with the locking lever 12 via the coupling link 15, and an end portion of the internal lever 112 moving in the vertical direction is coupled with a lower portion of a link 23 described below. Thus, the unlocking operation and the locking operation of the key cylinder K are transmitted to the locking lever 12 via the key lever 11 and the coupling link 15, and are transmitted to a detection switch 22 via the key lever 11, the link 23, and the transmitting member 21 described below. Incidentally, the length of the long hole 112*a* is set a little more than a length corresponding to a moving quantity of the locking lever 12** from the locked position to the unlocked position and vice versa.

The locking lever 12 is supported in the housing 10 pivotably at a predetermined angle by a shaft 121 oriented to the lateral direction, is pivotable from a locked position shown in FIG. 4 to an unlocked position shown in FIG. 5 and vice versa, and is biased in respective directions by a biasing force of an over-center spring 25 supported to the housing 10. The locking lever 12 is held in the locked position by abutting with a first stopper part 104 (for example, see FIG. 6) formed on the housing 10, and is held in the unlocked position by abutting with a second stopper part 105 (for example, see FIG. 11) formed on the housing 10.

A lower end portion of the locking lever 12 is connected with an end portion of an operating-force transmitting member 24 and the coupling link 15, wherein the operating-force transmitting member 24 is capable of transmitting an operating force of a locking knob LK provided in the vehicle-interior side of the door. Moreover, the locking lever 12 is provided with a first and second engaging portions 122, 123 which are capable of selectively engaging with a plurality of projecting portions 171 (three pieces in the present embodiment) respectively provided on front and rear surfaces of the worm wheel 17 when the worm wheel 17 rotates by actuation of the motor 16. Thus, the locking lever 12 pivots from the locked position shown in FIG. 4 to the unlocked position shown in FIG. 11 and vice versa against the biasing force of the over-center spring 25 on the basis of each manual operation of the locking knob LK and the key cylinder K and rotation of the worm wheel 17 by an electrical actuation of the motor 16.

As understandable from FIGS. 6 to 11, a coil portion 251 of the over-center spring 25 is supported to the housing 10, one arm portion 252 is fixed to the housing 10, and the other arm portion 253 formed in a mountain-like shape is a free end. A projecting portion 125 of the locking lever 12 slides on the other arm portion 253 while bending it, and thus, the locking lever 12 can pivot from the locked position to the unlocked position and vice versa.

The biasing direction of the over-center spring 25 acting on the locking lever 12 reverses with an intermediate position between the unlocked and locked positions of the locking lever 12 as a boundary. That is, the biasing force of the over-center spring 12 acts in the unlocking direction when the locking lever 12 is positioned in a side of the unlocked position than the intermediate position, and acts in the locking direction when the locking lever 12 is positioned in a side of the locked position than the intermediate position.

As shown in FIGS. 4, 5, a support hole 141 formed in a hand-drum shape and provided in a lower portion of the opening link 14 is engaged with an end portion 181 of the outside lever 18 so as to be swingable in the longitudinal direction, and a long hole 142 of the opening link 14 in the vertical direction is engaged with the locking lever 12 so as to be slidable in the vertical direction. Thus, the opening link 14 can swing around the end portion 181 from the locked position shown in FIG. 4 to the unlocked position shown in FIG. 11 and vice versa according to the movement of the locking lever 12 between the locked and unlocked positions, and moves in an opening direction (upper direction) on the basis of pivoting of the outside lever 18 by the opening operation of the outside handle OH.

The worm wheel 17 is pivotably supported to the housing 10 by a shaft 26 and is engaged with a worm 161 fixed to a rotation shaft of the motor 16 to rotate normally and reversely by the electrical actuation of the motor 16.

As shown in FIG. 4, in the case where the locking lever 12 and the opening link 14 are in each of the locked positions, when the motor 16 rotates on the basis of an unlocking operation of an operating switch provided in a vehicle interior or a mobile operating switch, the worm wheel 17 pivots in the unlocking direction (the counter-clockwise direction in FIG. 4) and one of the plurality of the projecting portions 171 on the rear surface abuts against the second arm portion 123. Thus, the locking lever 12 pivots in the unlocking direction (the clockwise direction in FIG. 4) against the biasing force of the over-center spring 25 to move to the unlocked position shown in FIG. 5. Then, when the locking lever 12 and the opening link 14 respectively move to each of the unlocked positions, just before that, a detection lever 131 of a position switch 13 is turned on by contacting a detected portion 124 of the locking lever 12, and thereby stopping the rotation of the motor 16. Moreover, when the locking knob LK is operated to unlock, the unlocking operation of the locking knob LK is transmitted to the locking lever 12 via the operating-force transmitting member 24, and the locking lever 12 is moved from the locked position to the unlocked position against the biasing force of the over-center spring 25. Incidentally, an actuation when the key cylinder K is operated to unlock is described later.

As shown in FIG. 5, in the case where the locking lever 12 and the opening link 14 are in each of the unlocked positions, when the motor 16 rotates on the basis of a locking operation of the operating switch provided in the vehicle interior or the mobile operating switch, the worm wheel 17 rotates in the locking direction (the clockwise direction in FIG. 5) and one of the plurality of the projecting portions 171 on the front surface abuts against the first arm portion 122. Thus, the locking lever 12 pivots in the locking direction (the counterclockwise direction in FIG. 5) against the biasing force of the over-center spring 25 to move to the locked position shown in FIG. 4. Then, when the locking lever 12 and the opening link 14 respectively move to each of the locked positions, just before that, the detection lever 131 of the position switch 13 leaves from the detected portion 124 of the locking lever 12 to detect that the locking lever 12 has moved to the locked position, and thereby stopping the rotation of the motor 16. Moreover, when the locking knob LK is operated to lock, the locking operation of the locking knob LK is transmitted to the locking lever 12 via the operating-force transmitting member 24, and the locking lever 12 is moved from the unlocked position to the locked position against the biasing force of the over-center spring 25.

The outside lever 18 is supported to the lower portion of the housing 10 pivotably at a predetermined angle by a shaft 182 (see FIG. 1) oriented to the longitudinal direction, an end portion in the vehicle-exterior side of the outside lever 18 is connected with the outside handle OH via an operating-force transmitting member 27 oriented to the vertical direction, and, as described above, the end portion 181 in the vehicle-interior side of the outside lever 18 is coupled with the support hole 141 of the opening link 14 to move the opening link 14 upward by pivoting on the basis of the door opening operation of the outside handle OH.

As shown in FIG. 5, in the unlocking state where the locking lever 12 and the opening link 14 are in each of the unlocked positions, when the outside lever 18 pivots on the basis of the door opening operation of the outside handle OH, the opening link 14 moves upward from the unlocked position, and a releasing portion 143 formed in the opening link 14 abuts against the opening lever 9 from below. Thus, the pawl 8 pivots in the opening direction together with the opening lever 9 to disengage from the latch 6, and thereby enabling the door to open.

As shown in FIG. 4, in the locking state where the locking lever 12 and the opening link 14 are in each of the locked positions, when the outside lever 18 pivots on the basis of the door opening operation of the outside handle OH, although the opening link 14 moves upward from the locked position, the pawl 8 is not possible to pivot in the opening direction because the releasing portion 143 moves upward so as to cross in front of the opening lever 9, and thereby disabling the door from opening.

The inside lever 19 is supported to the housing 10 pivotably at a predetermined angle by a shaft 191 oriented to the lateral direction, and its lower portion is connected with the inside handle IH via an operating-force transmitting member 28. Thus, the inside lever 19 pivots at a predetermined angle in an opening direction (the clockwise direction in FIGS. 4, 5) from an initial position (this position is shown in FIGS. 4, 5) on the basis of an opening operation of the inside handle IH, an abutting portion 192 formed in the inside lever 19 abuts against an abutted portion 183 of the outside lever 18 from below to make the outside lever 18 pivot in the opening direction, and the door can be opened as described above when the locking lever 12 and the opening link 14 are in each of the locked positions.

The detection device 20 comprises the transmitting member 21 supported by the housing 10, a key switch 22 (corresponding to the detection switch of the present invention) that is turned on and off according to pivoting of the transmitting member 21, and the link 23 movable vertically in conjunction with pivoting of the key lever 11. Incidentally, the detection device 20 does not always need the link 23. For example, when the transmitting member 21 is directly connected with the key lever 11, the link 23 can be omitted.

Moreover, an actuation transmission mechanism of the present invention comprises the transmitting member 21 and a detection lever 221 of the key switch 22 functioning as a transmitted member, and can be also applied to a device other than the detection device 20 and the motor-vehicle door locking device.

The key switch 22 is fixed to the housing 10, and is comprised of a casing 222 including an electric contact point and the detection lever 221 as a transmitted member supported to the casing 222 pivotably at a predetermined angle by a pivoting shaft 221*a*.

Figure 6:
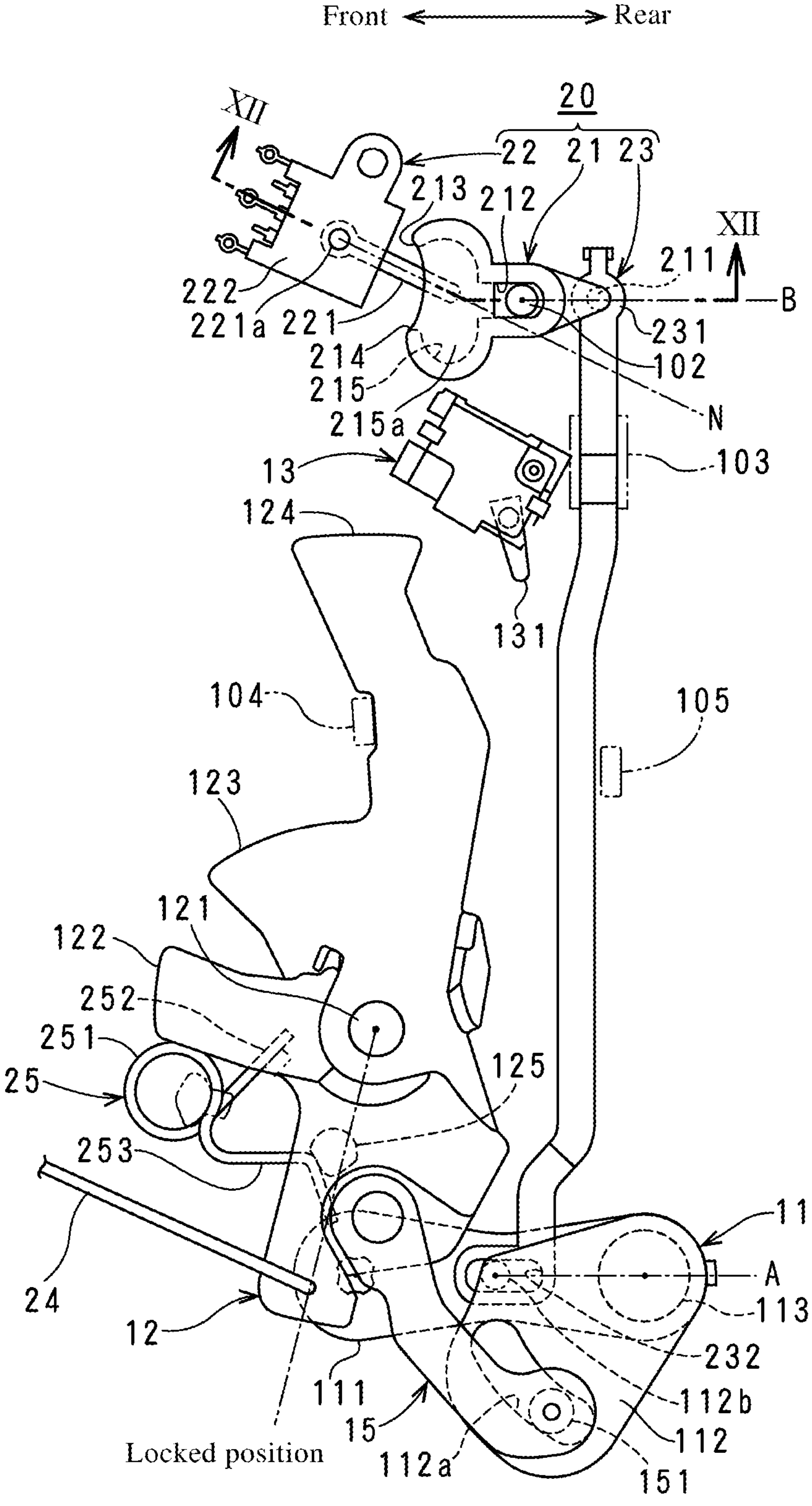
FIG. 6 is a vehicle-interior side elevational view showing a principal part of the door locking device in the locking state.
Figure 11:
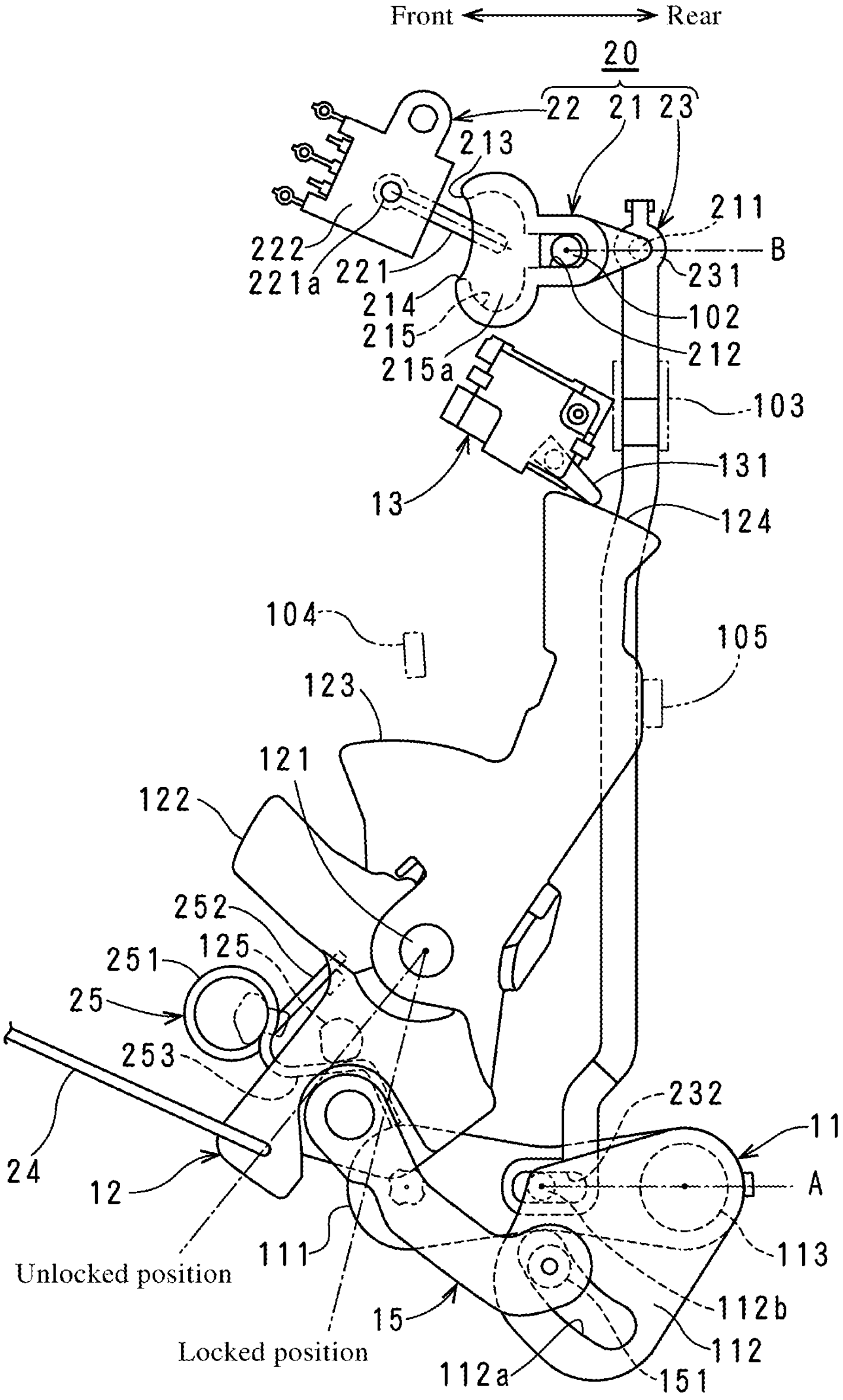
FIG. 11 is a vehicle-interior side elevational view showing the principal part of the door locking device in the unlocking state.

The detection lever 221 is normally held in an initial position (a driven initial position) shown in FIGS. 6, 11 by a spring not shown, pivots at a predetermined angle in the clockwise direction that is one driven direction from the initial position to detect the unlocking operation of the key cylinder K, and pivots at a predetermined angle in the counterclockwise direction that is the other driven direction from the initial position to detect the locking operation of the key cylinder K. Incidentally, a permissible range of pivoting for the detection lever 221 is set at a predetermined maximum angle. Therefore, the detection lever 221 cannot substantially pivot to a position beyond the maximum angle.

The link 23 (corresponding to "moving member" in the present invention) is supported by a guide part 103 formed on the housing 10 so as to be movable linearly in the vertical direction, its upper end portion 231 is coupled with a coupling shaft portion 211 provided on a rear end portion of the transmitting member 21 so as to be relatively pivotable at a predetermined angle, and a long hole 232 in the longitudinal direction formed in a lower end portion of the link 23 is coupled with a coupling shaft portion 112*b* provided on the internal lever 112. Thus, when the internal lever 112 pivots in the counterclockwise direction or the clockwise direction from the initial position on the basis of the locking or unlocking operation of the key cylinder K, the link 23 moves linearly in a predetermined quantity downward or upward from the initial position shown in FIGS. 6, 11 to convert this linear movement to a rotation movement and transmit this rotation movement to the transmitting member 21.

As shown in FIGS. 6, 11, the upper end portion 231 of the link 23, namely, a coupling portion with the transmitting member 21 is in the closest position to a shaft 102 provided on the housing 10 described below when the transmitting member 21 and the link 23 are in each of the initial positions, and moves so as to leave from the shaft 102 according to the upward or downward movement of the link 23 by pivoting of the internal lever 112 in the clockwise or counterclockwise direction.

The transmitting member 21 is arranged in the rear vicinity of the key switch 22, and a long hole 212 formed in the transmitting member 21 to be oriented to the longitudinal direction is engaged with the shaft 102 that is on the housing 10 and is provided in the vicinity of the key switch 22 to be projected to the vehicle-interior side. Thus, the transmitting member 21 is supported by the shaft 102 such that it is movable in a predetermined quantity in separating and approaching directions (left and right directions in FIGS. 6 to 11) perpendicular to a pivoting axis line direction and is pivotable at a predetermined angle around the shaft 102, and the coupling shaft portion 211 provided on the rear end portion of the transmitting member 21 is coupled with the upper end portion 231 of the link 23 so as to be pivotable at a predetermined angle. Incidentally, when the transmitting member 21 is in the initial position shown in FIGS. 6, 11, the shaft 102 is positioned at a rear end of the long hole 212 of the transmitting member 21. The coupling shaft portion 211 of the transmitting member 21 is pivotably coupled with the upper end portion 231 of the link 23 so as not to substantially occur looseness at least in the longitudinal direction.

Moreover, with the shaft 102 as a boundary, the transmitting member 21 has a first and second abutting portions 213, 214 and an inserted portion 215 in its front side near to the detection switch 22, and has the coupling shaft portion 211 with which the link 23 is coupled in its rear side.

When the transmitting member 21 pivots from the initial position in the counterclockwise direction (unlocking direction) that is one driving direction shown in FIGS. 6, 11, the first abutting portion 213 abuts against the detection lever 221 of the detection switch 22 from above to make the detection lever 221 pivot in the clockwise direction that is the one driven direction around the pivoting shaft 221*a*.

When the transmitting member 21 pivots from the initial position in the clockwise direction (locking direction) that is the other driving direction shown in FIGS. 6, 11, the second abutting portion 214 abuts against the detection lever 221 of the detection switch 22 from below to make the detection lever 221 pivot in the counterclockwise direction that is the other driven direction around the pivoting shaft 221*a*.

Figure 12:
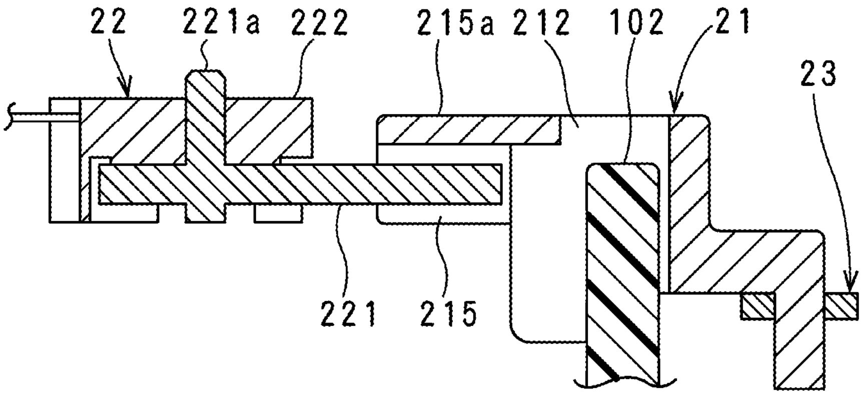
FIG. 12 is a sectional view taken along the line XII-XII in FIG. 6.

The inserted portion 215 is formed between the first and second abutting portions 213, 214, and as understandable from FIG. 12, its surface side is closed by a cover portion 215*a* such that a tip end portion and its vicinity of the detection lever 221 are inserted. Since the detection lever 221 is inserted into the inserted portion 215 of the transmitting member 21, the detection lever 221 is prevented from rocking in its axis line direction by the cover portion 215*a*, and the first and second abutting portions 213, 214 of the transmitting member 21 are enabled to securely abut with the detection lever 221.

As described above, when the link 23 moves upward from the initial position on the basis of the unlocking operation of the key cylinder K, since the upper end portion 231 of the link 23 moves upward to leave from the shaft 102, the coupling shaft portion 211 of the transmitting member 21 moves in an obliquely rear upward direction regarding the shaft 102. Thus, the transmitting member 21 moves in the obliquely rear upward direction while pivoting around the shaft 102 from the initial position in the counterclockwise direction. When the transmitting member 21 moves in the obliquely rear upward direction, an abutting part of the first abutting portion 213 to the detection lever 221 moves in a direction away from the pivoting shaft 221*a* of the detection lever 221.

Next, on the basis of FIGS. 6 to 13, there is described the operation of a principal part (the key lever 11, the locking lever 12, the position switch 13, the detection device 20, and the actuation transmission mechanism) of the present embodiment.

Figure 13:
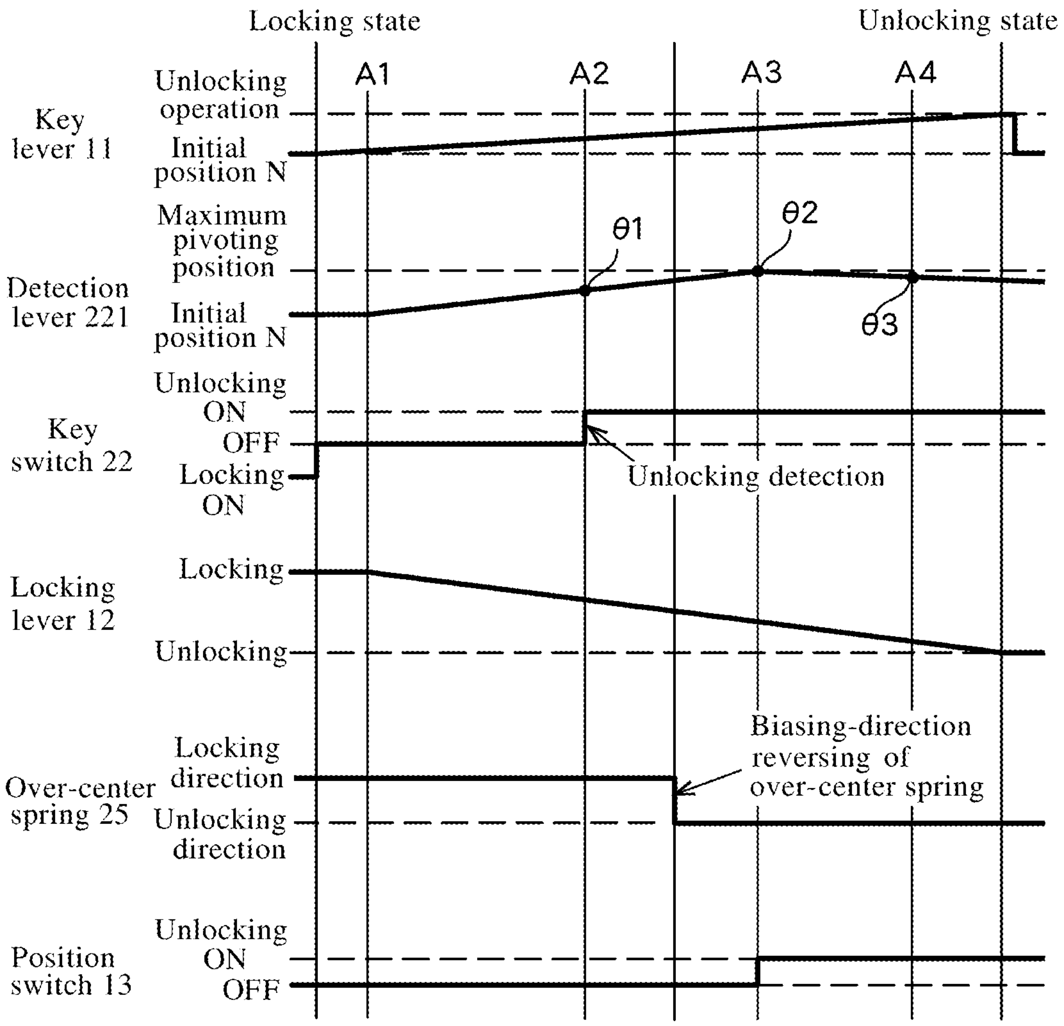
FIG. 13 is a timing diagram for explaining an actuation timing of the principal part of the door locking device.

Each of FIGS. 6 to 11 is a side elevational view showing the principal part in the locking state (FIG. 6), in the unlocking operation state (FIGS. 7 to 10), and in the unlocking state (FIG. 11). FIG. 12 is a sectional view taken along the line XII-XII in FIG. 6. FIG. 13 is a timing diagram for explaining an actuation timing of the principal part.

In the locking state shown in FIG. 6, when the key cylinder K is operated to unlock, this unlocking operation is transmitted to the internal lever 112 of the key lever 11 via the operating-force transmitting member R. The internal lever 112 pivots in the clockwise direction from the initial position A shown in FIG. 6 on the basis of the unlocking operation of the key cylinder K, and transmits this pivoting to the locking lever 12 via the coupling link 15 and the transmitting member 21 via the link 23 respectively.

Figure 7:
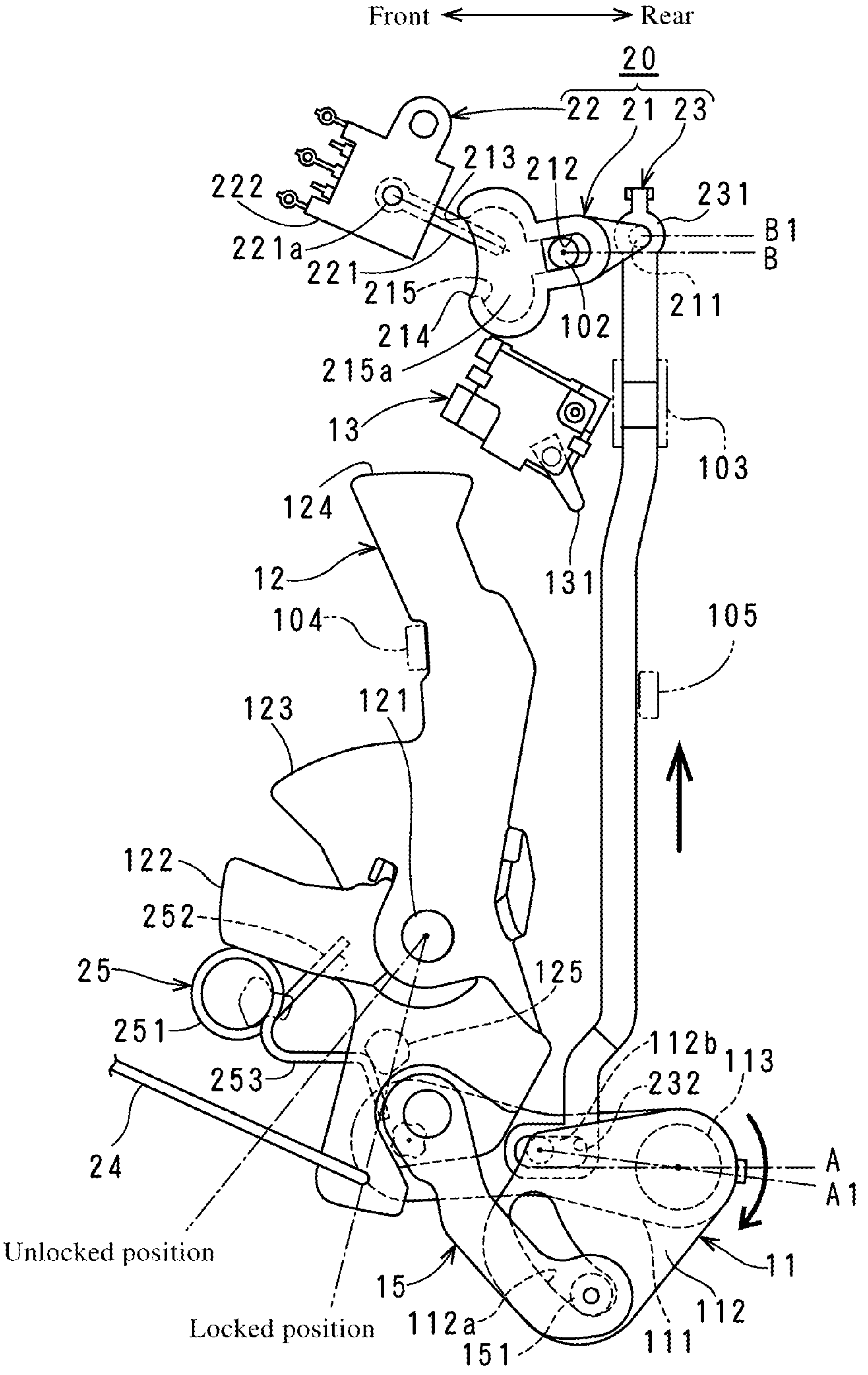
FIG. 7 is a vehicle-interior side elevational view showing an initial actuation of the principal part of the door locking device when a key cylinder is operated to unlock.

As shown in FIG. 7, when the internal lever 112 pivots at an angle A1 from the initial position A, the link 23 moves upward from the initial position B to a position B1. Thus, the transmitting member 21 moves in the obliquely rear upward direction while pivoting around the shaft 102 in the counterclockwise direction, and the first abutting portion 213 of the transmitting member 21 abuts against an upper surface of the detection lever 221 of the key switch 22.

Incidentally, in the state shown in FIG. 7, an initial pivoting in the clockwise direction of the internal lever 112 is not transmitted to the locking lever 12 because there is an initial looseness in the clockwise direction between the rear end of the long hole 112*a* of the internal lever 112 and a coupling shaft 151 of the coupling link 15. Moreover, an initial pivoting in the counterclockwise direction of the transmitting member 21 is not transmitted to the detection lever 221 because there is an initial looseness between the first abutting portion 213 of the transmitting member 21 and the detection lever 221.

Figure 8:
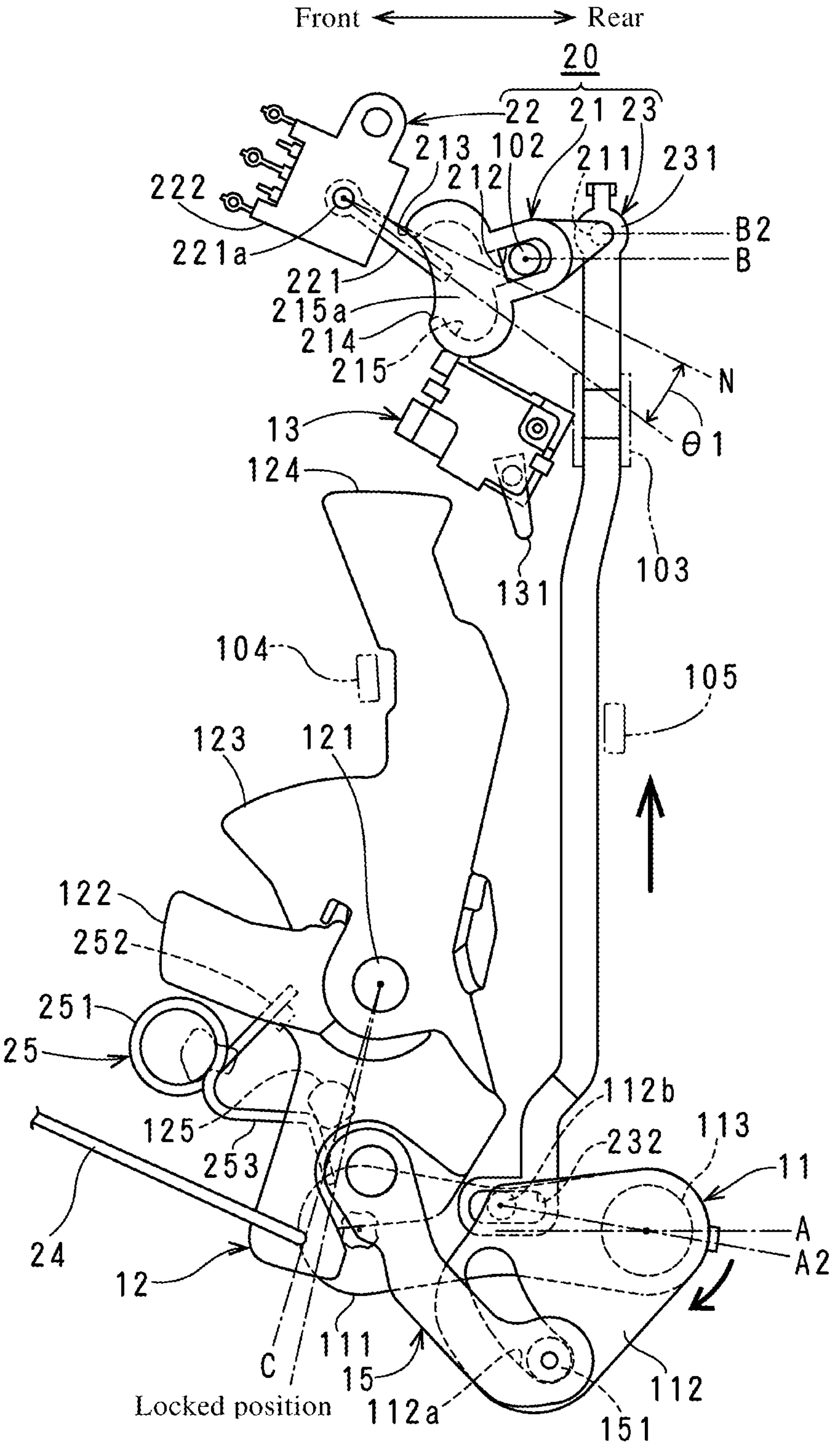
FIG. 8 is a vehicle-interior side elevational view showing a further actuated state from the initial actuation of the principal part of the door locking device when the key cylinder is operated to unlock.

Moreover, when the internal lever 112 pivots in the clockwise direction further to a position at an angle A2 shown in FIG. 8 according to the unlocking operation of the key cylinder K, the locking lever 12 pivots in the unlocking direction from the locked position to a front position C situated in front of a biasing-direction reversing position of the over-center spring 25 (intermediate position between the locked and unlocked positions). Moreover, the link 23 moves upward further to a position B2.

As shown in FIG. 8, when the link 23 moves upward to the position B2, the transmitting member 21 moves in the obliquely rear upward direction further while pivoting in the counterclockwise direction around the shaft 102. Accordingly, when the detection lever 221 of the key switch 22 pivots in the clockwise direction around the pivoting shaft 221*a* from the initial position N at a predetermined angle θ1, that is, to a detection position, the key switch 22 detects unlocking on the basis that an unlocking contact point that is an electric contact point in the casing 222 is turned on. An unlocking detection signal is transmitted to an ECU (Electronic Control Unit) not shown that is mounted on the vehicle.

As understandable from FIG. 13, timing for detecting the unlocking operation of the key cylinder K by the key switch 22 is set at a point of time when the locking lever 12 reaches the front position C situated in front of the biasing-direction reversing position of the over-center spring 25, in other words, before the biasing direction of the over-center spring 25 reverses. According to such a formation, it is possible to surely achieve the unlocking detection of the key switch 22 before the unlocking detection of the position switch 13, and therefore it is possible to surely discriminate whether the key cylinder K has been operated to unlock on the basis of using a key plate by a regular user or the locking lever 12 has been operated to unlock by a dishonest act.

Figure 9:
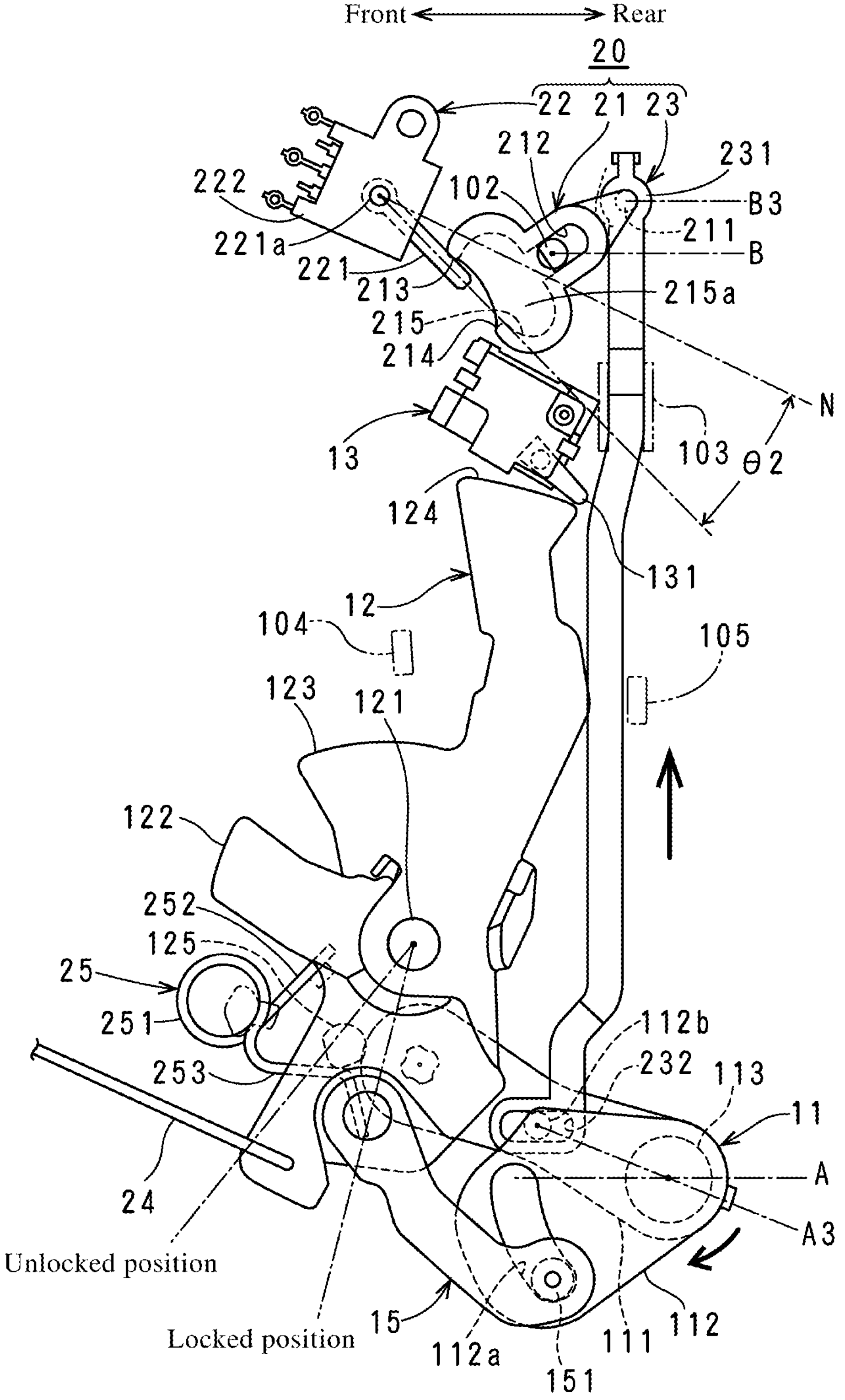
FIG. 9 is a vehicle-interior side elevational view showing a furthermore actuated state of the principal part of the door locking device when the key cylinder is operated to unlock.

Moreover, as shown in FIG. 9, when the internal lever 112 pivots to a position at an angle A3 on the basis of the unlocking operation of the key cylinder K, the locking lever 12 passes the biasing-direction reversing position (intermediate position) of the over-center spring 25 and pivots vigorously in the unlocking direction by the biasing force in the unlocking direction of the over-center spring 25. The position switch 13 detects the unlocked position of the locking lever 12 on the basis that the detection lever 131 contacts the detected portion 124 of the locking lever 12. Moreover, the link 23 moves upward to a position B3 according to the pivoting of the internal lever 112 in the clockwise direction, and transmits this movement to the transmitting member 21. According to the upward movement of the link 23, the transmitting member 21 moves in the obliquely rear upward direction while pivoting further in the counterclockwise direction. According to the pivoting of the transmitting member 21, the detection lever 221 pivots further in the clockwise direction to its maximum pivoting position or a position at a pivoting angle θ2 just before the maximum pivoting position.

Figure 10:
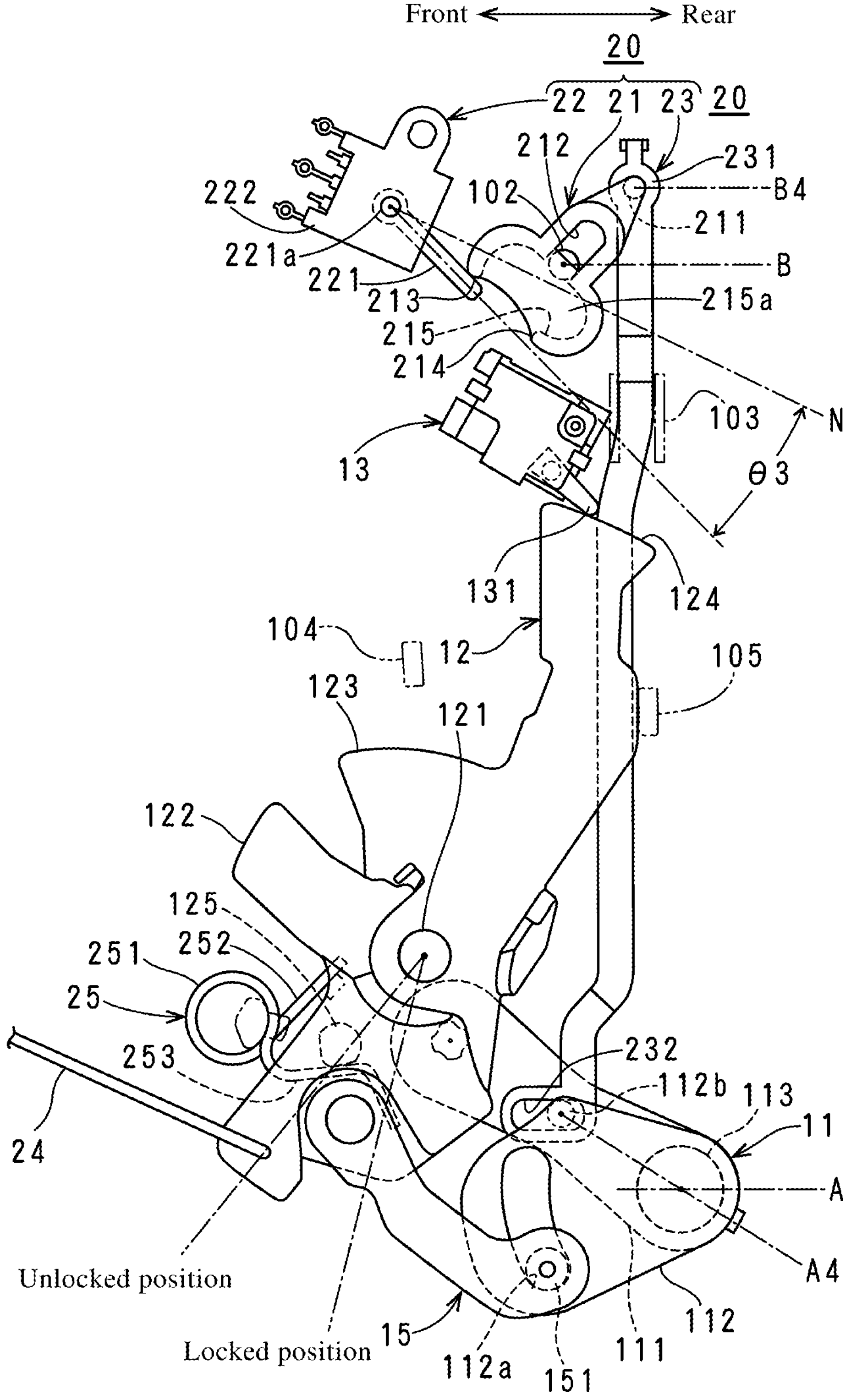
FIG. 10 is a vehicle-interior side elevational view showing a state that the principal part of the door locking device is actuated to an unlocked position on the basis of the unlocking operation of the key cylinder.

Moreover, as shown in FIG. 10, when the internal lever 112 pivots to a position at an angle A4 on the basis of the unlocking operation of the key cylinder K, the locking lever 12 stops in the unlocked position by contacting the second stopper part 105, and thereby preventing the internal lever 112 from further pivoting. While the detection lever 131 remains to be contacting the detected portion 124 of the locking lever 12, the position switch 13 detects that the locking lever 12 has moved to the unlocked position. Moreover, the link 23 moves upward to a position B4 according to the pivoting of the internal lever 112 in the clockwise direction, and transmits this movement to the transmitting member 21. However, the transmitting member 21 pivots in the counterclockwise direction further according to the upward movement of the link 23 so as to move in the obliquely rear upward direction further, and thus the abutting part of the first abutting portion 213 to the detection lever 221 moves in a direction to leave from the pivoting shaft 221*a* of the detection lever 221. Therefore, the detection lever 221 of the key switch 22 pivots reversely from the just before position at the pivoting angle θ2 shown in FIG. 9 to a position at a pivoting angle θ3 at which the angle is smaller than θ2 at the just before position.

As described above, after the key switch 22 detects the unlocking operation of the key cylinder K, though the transmitting member 21 pivots in the counterclockwise direction further on the basis of the operation of the key cylinder K in the unlocking direction, the transmitting member 21 does not make the detection lever 221 pivot overly to a large extent in the clockwise direction from the detection position, and thus does not give an overload in the clockwise direction on the detection lever 221. Therefore, the key switch 22 can detect the unlocking operation of the key cylinder K in an early stage and surely prevent the detection lever 221 from damage.

After the locking lever 12 pivots in the unlocked position, the unlocking operation of the key cylinder K is stopped and the key cylinder K is returned to the initial position. Thus, as shown in FIG. 11, the door locking device 1 comes into the unlocking state in which the locking lever 12 and the opening link 14 are held in each of the unlocked positions, and in which the key lever 11, the link 23, the transmitting member 21, and the detection lever 221 of the key switch 22 are returned to each of the initial positions.

In the unlocking state shown in FIG. 11, when the key cylinder K is operated to lock, although its drawing is omitted, this locking operation is transmitted to the internal lever 112 of the key lever 11 via the operating-force transmitting member R. The internal lever 112 pivots in the counterclockwise direction (locking direction) from the initial position shown in FIG. 11 on the basis of the locking operation of the key cylinder K, and transmits this pivoting to the locking lever 12 via the coupling link 15 and the transmitting member 21 via the link 23 respectively.

When the internal lever 112 pivots in the counterclockwise direction, the link 23 moves downward from the initial position B. Thus, the transmitting member 21 moves in an obliquely rear downward direction while pivoting in the clockwise direction around the shaft 102, and the second abutting portion 214 of the transmitting member 21 abuts against a lower surface of the detection lever 221 of the key switch 22. Accordingly, the key switch 22 detects the locking operation of the key cylinder K on the basis that the detection lever 221 pivots at a predetermined angle in the counterclockwise direction around the pivoting shaft 221*a* such that a contact point in a locking side is turned on. In this case also, in the same way as the case of the unlocking operation of the key cylinder K, since the transmitting member 21 moves in the obliquely rear downward direction while pivoting in the clockwise direction around the shaft 102, the transmitting member 21 does not make the detection lever 221 of the key switch 22 pivot overly to a large extent in the clockwise direction from the detection position where the contact point in the locking side is turned on.

Moreover, while the transmitting member 21 pivots in the counterclockwise direction from the initial position, the locking lever 12 pivots from the unlocked position to the locked position against the biasing force of the over-center spring 25 according to the pivoting of the internal lever 112 in the counterclockwise direction. After the locking lever 12 pivots to the locked position, the locking operation of the key cylinder K is stopped, and the key cylinder K is returned to the initial position. Thus, as shown in FIG. 6, the door locking device 1 comes into the locking state in which the locking lever 12 and the opening link 14 are held in each of the locked positions, and in which the key lever 11, the link 23, the transmitting member 21, and the detection lever 221 of the key switch 22 are returned to each of the initial positions.

As described above, the foregoing relates to one embodiment of the present invention, but the present invention is not limited to the above one embodiment, and various changes, modifications, and combinations may be added to the present embodiment without departing from the gist of the present invention as follows.

Figure 14:
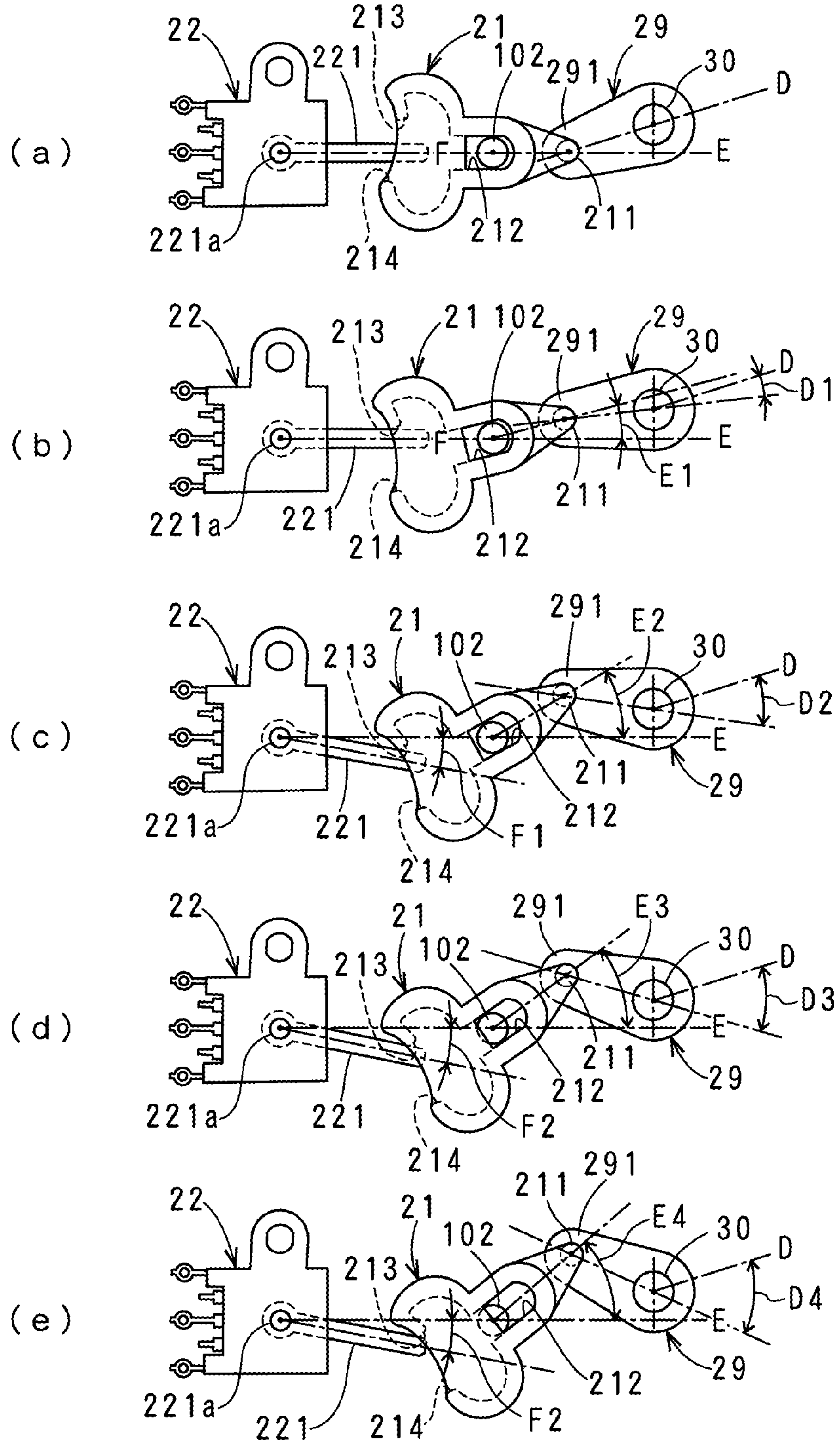
FIG. 14 is an explanatory drawing showing a modified example of a detection device.

(1) Regarding the detection device 20, as a modified example shown in FIG. 14, the link 23 movable linearly of the detection device 20 described in the above embodiment is changed to a moving member 29 movable rotationally.

There is described this modified example as follows. The moving member 29 is connected with the key cylinder K directly or via the key lever 11 and so on, and a front end portion 291 is pivotably coupled with the coupling shaft portion 211 of the transmitting member 21 such that the moving member 29 can pivot at a predetermined angle in the clockwise direction around a shaft 30 from an initial position D according to the locking operation of the key cylinder K.

There is described an actuation of this modified example with FIG. 14(*a*) to (*e*). Incidentally, in FIG. 14(*a*) to (*e*), parts having the respective same functions as those in the above embodiment are attached with the respective same reference signs as those in the above embodiment, and are not sometimes explained.

At first, when the moving member 29 pivots at an angle D1 in the clockwise direction from the initial position D shown in FIG. 14(*a*) according to the unlocking operation of the key cylinder K, the transmitting member 21 pivots from its initial position E at an angle E1 in the counterclockwise direction around the shaft 102 as shown in FIG. 14(*b*). The initial pivoting (pivoting at the angle E1) of the transmitting member 21 is not transmitted to the detection lever 221 because the initial looseness in the pivoting direction is set between the first abutting portion 213 of the transmitting member 21 and the detection lever 221 of the key switch 22. Incidentally, FIG. 14(*a*) corresponds to the state shown in FIG. 6 in the above embodiment, and FIG. 14(*b*) corresponds to the state shown in FIG. 7 in the above embodiment.

As shown in FIG. 14(*c*), the moving member 29 pivots at an angle D2 in the clockwise direction further such that the front end portion 291 can move upward according to the unlocking operation of the key cylinder K, the transmitting member 21 moves in an obliquely right upward direction while pivoting at an angle E2 in the counterclockwise direction around the shaft 102, and the first abutting portion 213 abuts against the detection lever 221 from above. Thus, the detection lever 221 pivots from its initial position F at an angle F1 in the clockwise direction around the pivoting shaft 221*a*, and turns on the unlocking contact point that is the electric contact point of the detection switch 22. Incidentally, FIG. 14(*c*) corresponds to the state shown in FIG. 8 in the above embodiment.

As shown in FIG. 14(*d*), according to the unlocking operation of the key cylinder K, when the moving member 29 pivots at an angle D3 in the clockwise direction further, the transmitting member 21 moves in the obliquely right upward direction while pivoting at an angle E3 in the counterclockwise direction further around the shaft 102. Thus, the detection lever 221 pivots at an angle F2 slightly larger than the angle F1 in the clockwise direction around the pivoting shaft 221*a* while keeping the unlocking contact point that is the electric contact point of the detection switch 22 turned on. Incidentally, FIG. 14(*d*) corresponds to the state shown in FIG. 9 in the above embodiment.

As shown in FIG. 14(*e*), according to the unlocking operation of the key cylinder K, when the moving member 29 pivots in the clockwise direction further to the maximum angle D4, the transmitting member 21 moves in the obliquely right upward direction while pivoting at an angle E4 in the counterclockwise direction further around the shaft 102. However, the detection lever 221 does not pivot in the clockwise direction while keeping the angle F2 because the abutting part of the first abutting portion 213 of the transmitting member 21 against the detection lever 221 leaves from the pivoting shaft 221*a* according to the movement of the transmitting member 21 in the obliquely right upward direction. Incidentally, FIG. 14(*e*) corresponds to the state shown in FIG. 10 in the above embodiment.

Figure 15:
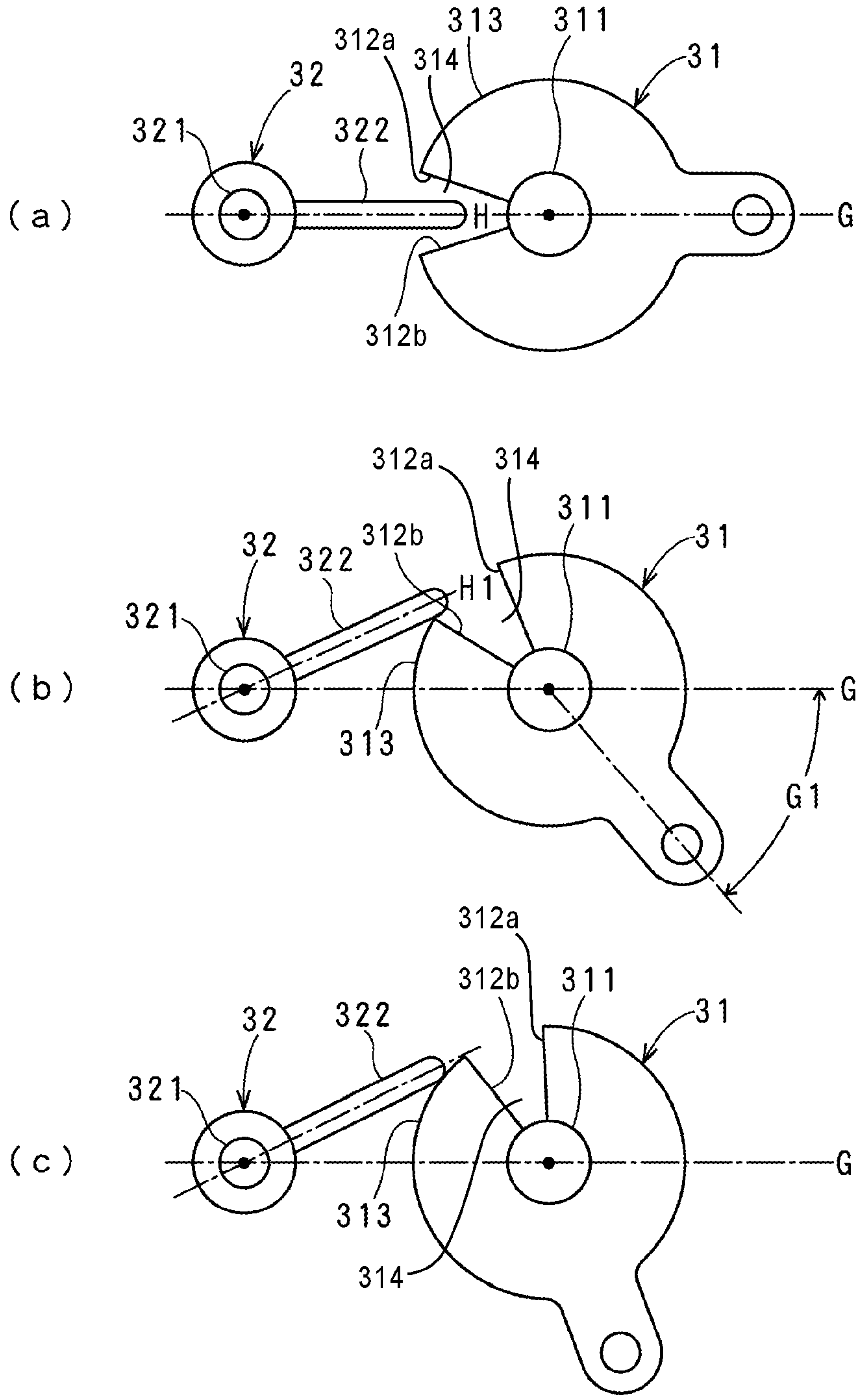
FIG. 15 is an explanatory drawing showing a modified example of an actuation transmission mechanism.

(2) The formation of the actuation transmission mechanism is changed to a modified example as shown in FIG. 15. In FIG. 15, a pivoting member indicated by the reference sign 31 corresponds to the transmitting member in the present invention or the transmitting member 21 of the above embodiment, and a transmitted member indicated by the reference sign 32 corresponds to the transmitted member in the present invention or the detection lever 221 in the above embodiment.

The pivoting member 31 is pivotably supported at a predetermined angle by a shaft 311 provided in the vicinity of the transmitted member 32, and is coupled with an operation device such as the key cylinder K, the outside handle OH, the inside handle IH, etc. so as to pivot around the shaft 311 in the clockwise direction or the counterclockwise direction from the initial position G shown in FIG. 15(*a*) according to the operation of the operation device.

Moreover, the pivoting member 31 has first and second abutting portions 312*a*, 312*b* that are capable of abutting against the transmitted member 32 in a pivoting direction, an inserted portion 314, and an arc portion 313 that is a peripheral portion of the pivoting member 31 and is centered on the shaft 311.

The transmitted member 32 is pivotably supported at a predetermined angle by the shaft 321, and held in an initial position H in the inserted portion 314 shown in FIG. 15 (*a*) by a spring not shown. The pivoting of the transmitted member 32 from the initial position H is transmitted to another additional lever not shown, and the operation of the operation device is transmitted to said another lever via the pivoting member 31 and the transmitted member 32.

When the pivoting member 31 pivots at a predetermined angle G1 according to the operation of the operation device, for example in the clockwise direction from the initial position G shown in FIG. 15 (*a*), the second abutting portion 312*b* of the pivoting member 31 abuts against the arm portion 322 of the transmitted member 32 from below. Thus, as shown in FIG. 15 (*b*), the transmitted member 32 pivots from the initial position H shown in FIG. 15 (*a*) to the detection position H1. When the pivoting member 31 pivots in the clockwise direction further, as shown in FIG. 15 (*c*), the transmitted member 32 slightly pivots in the counterclockwise direction from the detection position H1, and the arm portion 322 of the transmitted member 32 comes off the second abutting portion 312*b* and runs on to the arc portion 313. Then, though the pivoting member 31 pivots in the clockwise direction further from the position shown in FIG. 15 (*c*), the transmitted member 32 does not overly pivot to a large extent in the counterclockwise direction from the detection position H1 because a tip end portion of the arm portion 322 of the transmitted member 32 relatively moves on the arc portion 313 of the pivoting member 31 along the pivoting direction.

What is claimed is:

1. An actuation transmission mechanism comprising:

a transmitting member that is pivotably supported to pivot in a plurality of driving directions from a predetermined initial position and configured to transmit a pivoting motion of the transmitting member to a transmitted member that is pivotably supported in a vicinity of the transmitting member to pivot in a plurality of driven directions from a predetermined driven initial position, the transmitting member comprising:

a first abutting portion that abuts against the transmitted member to make the transmitted member pivot in one of the driven directions from the predetermined driven initial position when the transmitting member pivots in one of the driving directions from the predetermined initial position, a second abutting portion that abuts against the transmitted member to make the transmitted member pivot in another one of the driven directions from the driven initial position when the transmitting member pivots in another one of driving directions from the initial position, and an inserted portion which is formed between the first and second abutting portions and into which a tip end portion and its vicinity of the transmitted member are able to be inserted, wherein, when the transmitting member pivots from the initial position in the one driving direction, the transmitting member abuts against the transmitted member to make the transmitted member pivot in the one driven direction from the driven initial position to one predetermined detection position of a plurality of predetermined detection positions, and thereafter, though the transmitting member subsequently pivots in the one driving direction further, the transmitting member does not make the transmitted member pivot beyond one predetermined maximum pivoting angle of a plurality of predetermined maximum pivoting angles in the one driven direction, and wherein, when the transmitting member pivots from the initial position in the other driving direction, the transmitting member abuts against the transmitted member to make the transmitted member pivot in the other driven direction from the driven initial position to another predetermined detection position of the plurality of detection positions, and thereafter, though the transmitting member subsequently pivots in the other driving direction further, the transmitting member does not make the transmitted member pivot beyond another one of the predetermined maximum pivoting angles in the other driven direction.

2. The actuation transmission mechanism according to claim 1, wherein the transmitting member has a long hole engaging with a shaft provided in the vicinity of the transmitted member and elongating perpendicularly to the shaft, the transmitting member being configured to pivot at a predetermined angle around the shaft, the transmitting member being supported by the shaft to be linearly movable in separating and approaching directions respectively perpendicular to a shaft direction of the shaft such that while the transmitting member pivots in the one driving direction from the initial position, the first abutting portion that abuts against the transmitted member moves in the separating direction from a pivoting center of the transmitted member.

3. The actuation transmission mechanism according to claim 2, wherein the transmitting member is pivotably coupled with a moving member disposed in the vicinity of the transmitting member, the transmitting member moving in the separating and approaching directions in accordance with a movement of the moving member.

4. The actuation transmission mechanism according to claim 3, wherein the moving member is supported to be linearly movable in a vertical direction.

5. The actuation transmission mechanism according to claim 3, wherein the moving member is supported to be pivotable at a predetermined angle.

6. The actuation transmission mechanism according to claim 1, wherein the transmitting member has a long hole engaging with a shaft provided in the vicinity of the transmitted member and elongating perpendicularly to the shaft, the transmitting member being configured to pivot at a predetermined angle around the shaft, the transmitting member being supported by the shaft to be linearly movable in separating and approaching directions respectively perpendicular to a shaft direction of the shaft such that while the transmitting member pivots in the one driving direction from the initial position, the first abutting portion that abuts against the transmitted member moves in the separating direction from a pivoting center of the transmitted member, wherein the transmitting member is pivotably coupled with a moving member disposed in the vicinity of the transmitting member, the transmitting member moving in the separating and approaching directions in accordance with a movement of the moving member, and wherein, with the shaft as a boundary, the transmitting member has the first and second abutting portions and the inserted portion in its one side near to the transmitted member, and the moving member is coupled with the other side opposite the one side of the transmitting member.

7. The actuation transmission mechanism according to claim 1, wherein the transmitting member is supported by a shaft provided in the vicinity of the transmitted member to be pivotable at a predetermined angle, the transmitting member having an arc portion of which a center is a pivoting center of the transmitting member, wherein the transmitted member abuts with the first abutting portion in accordance with the pivoting in the one driving direction from the initial position of the transmitting member and pivots from the driven initial position to the one detection position, and thereafter, though the transmitting member subsequently pivots in the one driving direction further, the transmitted member relatively slides on the arc portion in one pivoting direction of a plurality of pivoting directions to not pivot beyond one predetermined maximum pivoting angle of a plurality of maximum pivoting angles in the one driven direction, and wherein the transmitted member abuts with the second abutting portion in accordance with the pivoting in the other driving direction from the initial position of the transmitting member and pivots from the driven initial position to the other detection position, and thereafter, though the transmitting member subsequently pivots in the another driving direction further, the transmitted member relatively slides on the arc portion in another one of the pivoting directions to not pivot beyond another one of the predetermined maximum pivoting angles in the other driven direction.

8. A detection device comprising:

the actuation transmission mechanism according to claim 1, wherein the transmitted member is a detection lever that is supported to a casing of a detection switch having an electric contact point to be pivotable at a predetermined angle and pivots at least in the one driven direction and the other driven direction from the predetermined driven initial position to the one detection position and the other detection position, respectively, to turn on the detection switch, and the transmitting member is connected with an operation device provided on a predetermined position to pivot at least in the one driving direction and the other driving direction from the initial position based on an operation of the operation device.

9. The detection device according to claim 8, wherein the transmitting member has a long hole engaging with a shaft provided in the vicinity of the transmitted member and elongating perpendicularly to the shaft, the transmitting member being configured to pivot at a predetermined angle around the shaft, the transmitting member being supported by the shaft to be movable in separating and approaching directions respectively perpendicular to a shaft direction of the shaft such that while the transmitting member pivots in the one driving direction from the initial position, the first abutting portion against the transmitted member moves in the separating direction from a pivoting center of the transmitted member.

10. The detection device according to claim 8, wherein the transmitting member is supported by a shaft provided in the vicinity of the transmitted member to be pivotable at a predetermined angle, the transmitting member having an arc portion of which a center is a pivoting center of the transmitting member in addition to the first and second abutting portions and the inserted portion, wherein the transmitted member abuts with the first abutting portion in accordance with the pivoting in the one driving direction from the initial position of the transmitting member and pivots from the driven initial position to the one detection position, and thereafter, though the transmitting member subsequently pivots in the one driving direction further, the transmitted member relatively slides on the arc portion in one pivoting direction of a plurality of pivoting directions to not pivot beyond one predetermined maximum pivoting angle of a plurality of maximum pivoting angles in the one driven direction, and wherein the transmitted member abuts with the second abutting portion in accordance with the pivoting in the other driving direction from the initial position of the transmitting member and pivots from the driven initial position to the other detection position, and thereafter, though the transmitting member subsequently pivots in the other driving direction further, the transmitted member relatively slides on the arc portion in another pivoting direction of the pivoting directions to not pivot beyond another predetermined maximum pivoting angle of the maximum pivoting angles in the other driven direction.

11. A motor-vehicle door locking device comprising:

the detection device according to claim 8; and a locking lever movable from an unlocked position to a locked position and vice versa according to an operation of a key cylinder provided on a door, wherein the operation device is the key cylinder, and the transmitting member pivots in the one driving direction from the initial position according to an unlocking operation of the key cylinder.

12. The motor-vehicle door locking device according to claim 11, wherein the transmitting member has a long hole engaging with a shaft provided in the vicinity of the transmitted member and elongating perpendicularly to the shaft, the transmitting member being configured to pivot at a predetermined angle around the shaft, the transmitting member being supported by the shaft to be linearly movable in separating and approaching directions respectively perpendicular to a shaft direction of the shaft such that while the transmitting member pivots in the one driving direction from the initial position, its abutting portion against the transmitted member moves in the separating direction from a pivoting center of the transmitted member.

13. The motor-vehicle door locking device according to claim 11, wherein the transmitting member is supported by a shaft provided in the vicinity of the transmitted member to be pivotable at a predetermined angle, the transmitting member having an arc portion of which a center is a pivoting center of the transmitting member in addition to the first and second abutting portions and the inserted portion, wherein the transmitted member abuts with the first abutting portion in accordance with the pivoting in the one driving direction from the initial position of the transmitting member and pivots from the driven initial position to the one detection position, and thereafter, though the transmitting member subsequently pivots in the one driving direction further, the transmitted member relatively slides on the arc portion in one pivoting direction of a plurality of pivoting directions to not pivot beyond one predetermined maximum pivoting angle of a plurality of maximum pivoting angles in the one driven direction from the detection position, and wherein the transmitted member abuts with the second abutting portion in accordance with the pivoting in the other driving direction from the initial position of the transmitting member and pivots from the driven initial position to the other detection position, and thereafter, though the transmitting member subsequently pivots in the other driving direction further, the transmitted member relatively slides on the arc portion in another pivoting direction of the pivoting directions to not pivot beyond the other predetermined maximum pivoting angle of the maximum pivoting angles in the other driven direction.

14. A motor-vehicle door locking device comprising:

the detection device according to claim 8; and a locking lever movable from an unlocked position to a locked position and vice versa according to an operation of a key cylinder provided on a door, a position switch detecting the unlocked position of the locking lever, and a spring of which a biasing direction acting on the locking lever reverses with an intermediate position between the unlocked and locked positions of the locking lever as a boundary, wherein the operation device is the key cylinder, the transmitting member pivots in the one driving direction from the initial position according to an unlocking operation of the key cylinder and in the other driving direction from the initial position according to a locking operation of the key cylinder, the detection switch detects the unlocking operation of the key cylinder on the basis that the detection lever pivots to the one detection position before the locking lever reaches the intermediate position from the locked position according to the unlocking operation of the key cylinder, and thereafter, the position switch detects unlocking of the locking lever.

15. The motor-vehicle door locking device according to claim 14, wherein the transmitting member has a long hole engaging with a shaft provided in the vicinity of the transmitted member and elongating perpendicularly to the shaft, the transmitting member being configured to pivot at a predetermined angle around the shaft, the transmitting member being supported by the shaft to be linearly movable in separating and approaching directions respectively perpendicular to a shaft direction of the shaft such that while the transmitting member pivots in the one driving direction from the initial position, the first abutting portion that abuts abutting portion against the transmitted member moves in the separating direction from a pivoting center of the transmitted member.

16. The motor-vehicle door locking device according to claim 14, wherein the transmitting member is supported by a shaft provided in the vicinity of the transmitted member to be pivotable at a predetermined angle, the transmitting member having an abutting portion that is capable of abutting with the transmitted member in a pivoting direction and an arc portion of which a center is a pivoting center of the transmitting member, wherein the transmitted member abuts with the first abutting portion in accordance with the pivoting in the one driving direction from the initial position of the transmitting member and pivots from the driven initial position to the one detection position, and thereafter, though the transmitting member subsequently pivots in the one driving direction further, the transmitted member relatively slides on the arc portion in one pivoting direction of a plurality of pivoting directions to not pivot beyond one predetermined maximum pivoting angle of a plurality of maximum pivoting angles in the one driven direction, and wherein the transmitted member abuts with the second abutting portion in accordance with the pivoting in the other driving direction from the initial position of the transmitting member and pivots from the driven initial position to the other detection position, and thereafter, though the transmitting member subsequently pivots in the another driving direction further, the transmitted member relatively slides on the arc portion in another one of the pivoting directions to not pivot beyond another one of the predetermined maximum pivoting angles in the other driven direction.

* * * * *